(12) United States Patent
Sinclair

(10) Patent No.: US 7,433,993 B2
(45) Date of Patent: Oct. 7, 2008

(54) ADAPTIVE METABLOCKS

(75) Inventor: Alan Welsh Sinclair, Falkirk (GB)

(73) Assignee: San Disk Corportion, Milpitas, CA (US)

( * ) Notice: Subject to any disclaimer, the term of this patent is extended or adjusted under 35 U.S.C. 154(b) by 492 days.

(21) Appl. No.: 10/749,189

(22) Filed: Dec. 30, 2003

(65) Prior Publication Data

US 2005/0144357 A1    Jun. 30, 2005

(51) Int. Cl.
G06F 12/00 (2006.01)
(52) U.S. Cl. .......................... 711/103; 711/150
(58) Field of Classification Search ............ 711/5, 711/103, 165, 170–173; 365/230.01
See application file for complete search history.

(56) References Cited

U.S. PATENT DOCUMENTS

| | | |
|---|---|---|
| 5,043,940 A | 8/1991 | Harari |
| 5,070,032 A | 12/1991 | Yuan et al. |
| 5,095,344 A | 3/1992 | Harrari |
| 5,172,338 A | 12/1992 | Mehrotra et al. |
| 5,313,421 A | 5/1994 | Guterman et al. |
| 5,315,541 A | 5/1994 | Harari et al. |
| 5,343,063 A | 8/1994 | Yuan et al. |
| 5,367,484 A | 11/1994 | Alexander et al. |
| 5,404,485 A | 4/1995 | Ban |
| 5,473,765 A | 12/1995 | Gibbons et al. |
| 5,532,962 A | 7/1996 | Auclair et al. |
| 5,570,315 A | 10/1996 | Tanaka et al. |
| 5,661,053 A | 8/1997 | Yuan |
| 5,742,934 A | 4/1998 | Shinohara et al. |
| 5,751,634 A | 5/1998 | Itoh |
| 5,768,192 A | 6/1998 | Eitan |
| 5,774,397 A | 6/1998 | Endoh et al. |
| 5,798,968 A | 8/1998 | Lee et al. |
| 5,860,124 A | 1/1999 | Matthews et al. |
| 5,890,192 A | 3/1999 | Lee et al. |
| 5,903,495 A | 5/1999 | Takeuchi et al. |
| 5,907,856 A | 5/1999 | Estakhri et al. |
| 5,909,449 A | 6/1999 | So et al. |
| 5,930,167 A | 7/1999 | Lee et al. |
| 5,937,425 A | 8/1999 | Ban |

(Continued)

FOREIGN PATENT DOCUMENTS

EP    0 887 732    12/1998

(Continued)

OTHER PUBLICATIONS

Eitan et al., "NROM: A Novel Localized Trapping, 2-Bit Nonvolatile Memory Cell," IEE Electron Device Letters, vol. 21, No. 1, Nov. 2000, pp. 543-545.

(Continued)

*Primary Examiner*—Brian R Peugh
(74) *Attorney, Agent, or Firm*—Weaver Austin Villeneuve Sampson LLP

(57) ABSTRACT

In a memory system having multiple erase blocks in multiple planes, a selected number of erase blocks are programmed together as an adaptive metablock. The number of erase blocks in an adaptive metablock is chosen according to the data to be programmed. Logical address space is divided into logical groups, a logical group having the same size as one erase block. Adaptive logical blocks are formed from logical groups. One adaptive logical block is stored in one adaptive metablock.

8 Claims, 23 Drawing Sheets

U.S. PATENT DOCUMENTS

| | | | |
|---|---|---|---|
| 6,011,725 | A | 1/2000 | Eitan |
| 6,034,897 | A | 3/2000 | Estakhri et al. |
| 6,046,935 | A | 4/2000 | Takeuchi et al. |
| 6,125,435 | A | 9/2000 | Estakhri et al. |
| 6,141,249 | A | 10/2000 | Estakhri et al. |
| 6,222,762 | B1 | 4/2001 | Guterman et al. |
| 6,226,728 | B1 | 5/2001 | See et al. |
| 6,272,610 | B1 * | 8/2001 | Katayama et al. ........... 711/171 |
| 6,304,980 | B1 | 10/2001 | Beardsley et al. |
| 6,377,500 | B1 | 4/2002 | Fujimoto et al. |
| 6,401,160 | B1 | 6/2002 | See et al. |
| 6,421,279 | B1 | 7/2002 | Tobita et al. |
| 6,426,893 | B1 | 7/2002 | Conley et al. |
| 6,456,528 | B1 | 9/2002 | Chen |
| 6,490,649 | B2 | 12/2002 | Sinclair |
| 6,522,580 | B2 | 2/2003 | Chen et al. |
| 6,542,956 | B1 * | 4/2003 | Lee et al. .................... 711/103 |
| 6,563,734 | B2 | 5/2003 | Taki |
| 6,567,307 | B1 | 5/2003 | Estakhri |
| 6,571,261 | B1 | 5/2003 | Wang-Knop et al. |
| 6,591,330 | B2 | 7/2003 | Lasser |
| 6,643,170 | B2 | 11/2003 | Huang et al. ........... 365/185.03 |
| 6,725,321 | B1 | 4/2004 | Sinclair et al. |
| 6,763,424 | B2 | 7/2004 | Conley |
| 6,871,259 | B2 | 3/2005 | Hagiwara et al. |
| 6,898,662 | B2 * | 5/2005 | Gorobets .................... 711/103 |
| 6,988,175 | B2 * | 1/2006 | Lasser ....................... 711/156 |
| 7,032,065 | B2 * | 4/2006 | Gonzalez et al. ........... 711/103 |
| 2001/0042882 | A1 | 11/2001 | Chang et al. |
| 2002/0099904 | A1 | 7/2002 | Conley |
| 2003/0053334 | A1 | 3/2003 | Chen |
| 2003/0065899 | A1 | 4/2003 | Gorobets |
| 2003/0076709 | A1 | 4/2003 | Huang et al. |
| 2003/0109093 | A1 | 6/2003 | Harari et al. |
| 2003/0110343 | A1 | 6/2003 | Hagiwara et al. |
| 2004/0030825 | A1 * | 2/2004 | Otake et al. ................. 711/105 |
| 2004/0103241 | A1 | 5/2004 | Chang et al. |
| 2005/0141312 | A1 | 6/2005 | Sinclair et al. |
| 2005/0141313 | A1 | 6/2005 | Gorobets et al. |
| 2005/0144358 | A1 | 6/2005 | Conley et al. |
| 2005/0144360 | A1 | 6/2005 | Bennet et al. |
| 2005/0144363 | A1 * | 6/2005 | Sinclair ...................... 711/103 |
| 2005/0144365 | A1 | 6/2005 | Gorobets et al. |
| 2005/0144367 | A1 | 6/2005 | Sinclair |
| 2005/0166087 | A1 | 7/2005 | Gorobets |

FOREIGN PATENT DOCUMENTS

| | | |
|---|---|---|
| EP | 0 977 121 A2 | 2/2000 |
| EP | 1424631 A | 6/2004 |
| JP | 5314019 | 11/1993 |
| WO | WO 00/49488 | 8/2000 |
| WO | WO 01/18640 A1 | 3/2001 |
| WO | WO 02/058074 | 7/2002 |
| WO | WO 03/027828 | 4/2003 |
| WO | WO 03/029951 | 4/2003 |
| WO | WO 2004/040457 | 5/2004 |
| WO | WO 2004/040458 | 5/2004 |
| WO | WO 2004/040459 | 5/2004 |
| WO | WO 2004/040578 | 5/2004 |

OTHER PUBLICATIONS

EPO/ISA, "Notification of Transmittal of the International Search Report and the Written Opinion of the International Searching Authority, or the Declaration", mailed in related PCT/US2004/043692 on May 4, 2005, 9 pages.

ISA/EPO, "Communication Relating to the Results of the Partial International Search," mailed in related PCT/US2004/043680 on Jul. 5, 2005, 3 pages.

Bennett et al., "Scratch Pad Block", U.S. Appl. No. 11/016,285, filed Dec. 16, 2004, 55 pages.

Chang, Li-Pin et al., "An Adaptive Striping Architecture for Flash Memory Storage Systems of Embedded Systems", Proceedings of the Eighth IEEE Real-Time and Embedded Technology and Applications Symposium, Sep. 24, 2002, pp. 187-196.

EPO/ISA, "Notification of Transmittal of the International Search Report and the Written Opinion of the International Searching Authority, or the Declaration", mailed in related PCT/US2004/043597 on Aug. 8, 2005, 12 pages.

EPO/ISA, "Notification of Transmittal of the International Search Report and the Written Opinion of the International Searching Authority, or the Declaration", mailed in related PCT/US2004/043680 on Sep. 23, 2005, 18 pages.

USPTO, "Office Action," mailed in related U.S. Appl. No. 10/841,118 on Jun. 16, 2006, 29 pages.

USPTO, "Final Office Action," mailed in related U.S. Appl. No. 10/841,118 on Feb. 6, 2007, 32 pages.

USPTO, "Notice of Allowance," mailed in related U.S. Appl. No. 11/016,271 on Jun. 13, 2007, 16 pages.

European Patent Office, Examiner's Report mailed in corresponding European Application No. 04 815 389.4 on Aug. 23, 2007, 5 pages.

Kim et al., "A Space-Efficient Flash Translation Layer for CompactFlash Systems," IEEE Transaction on Consumer Electronics, vol. 48, No. 2, May 2002, pp. 366-375.

USPTO, Office Action, mailed in related U.S. Appl. No. 10/841,118 on Oct. 19, 2007, 9 pages.

USPTO, "Notice of Allowance," mailed in related U.S. Appl. No. 11/016,271 on Jan. 31, 2008 (13 pages).

SIPO issued "Office Action" in related Chinese Patent Application dated Dec. 7, 2007 (14 pages).

* cited by examiner

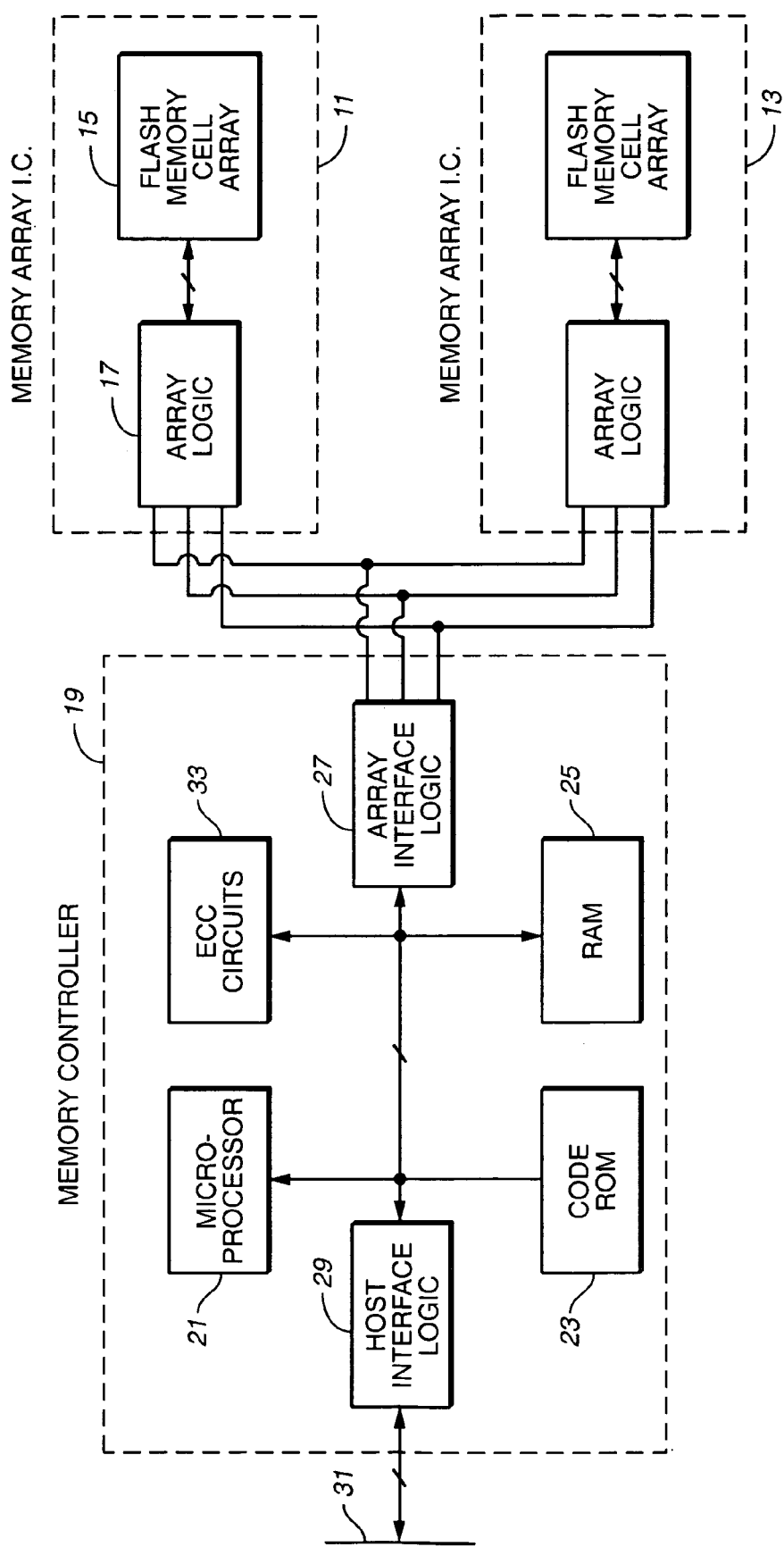
FIG._1A

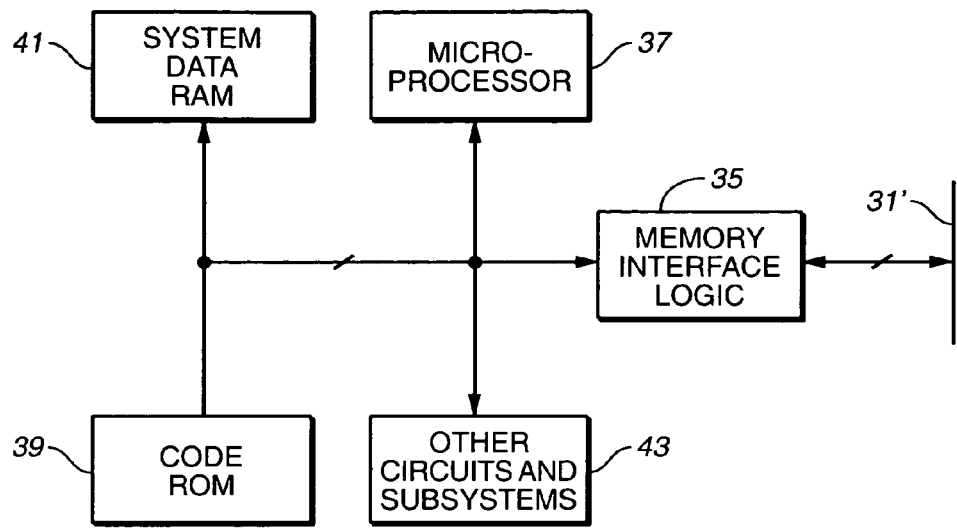
FIG._1B
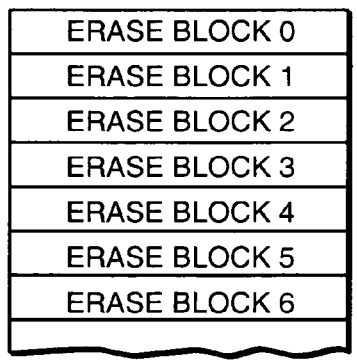
FIG._2
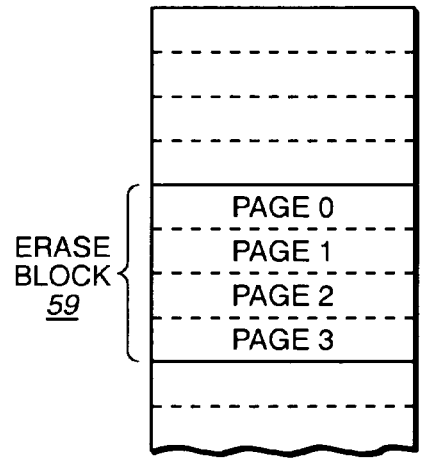
FIG._4
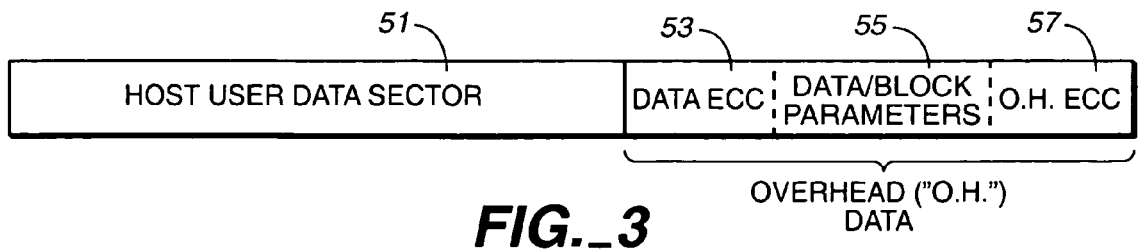
FIG._3

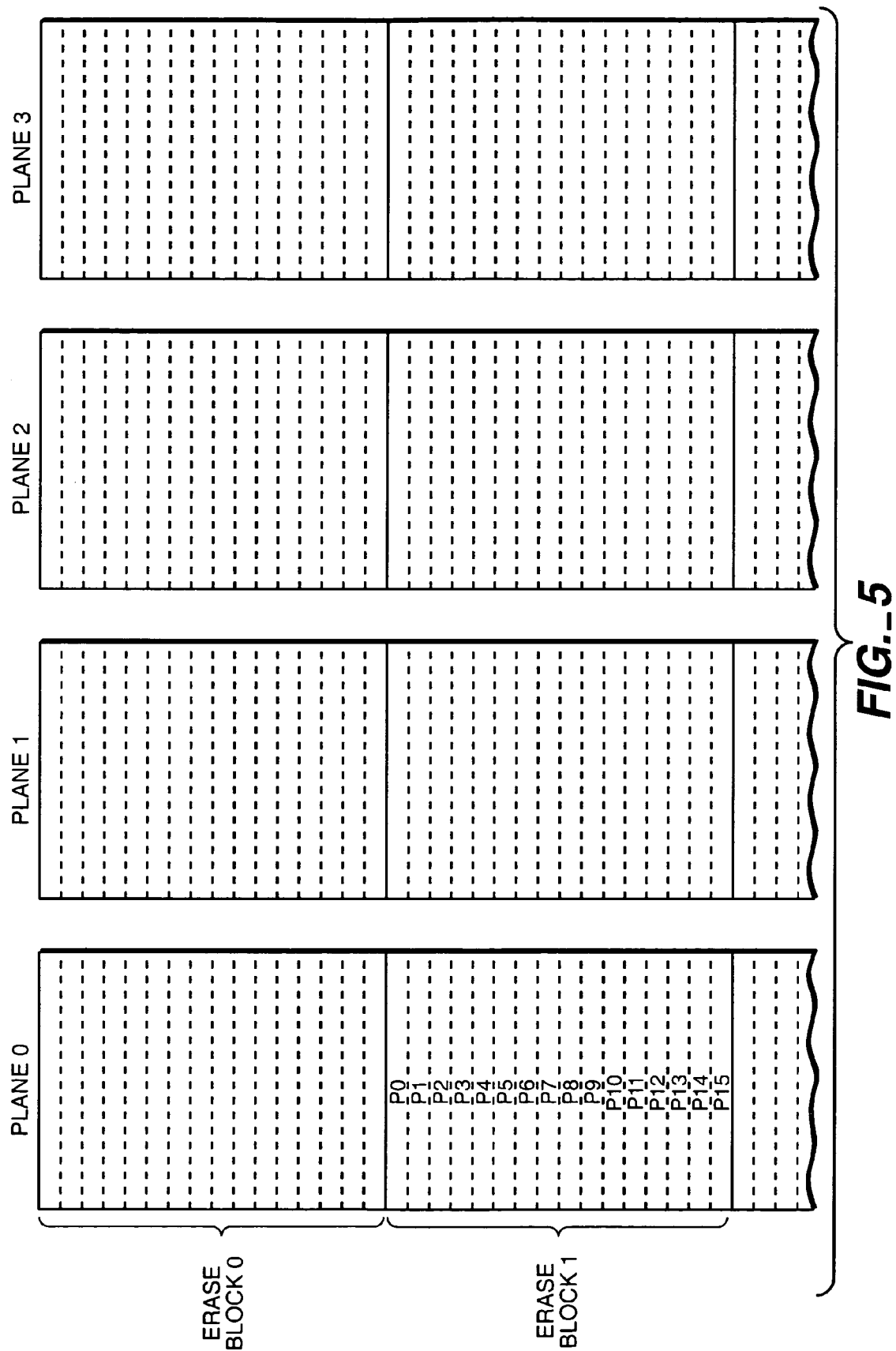
FIG._5

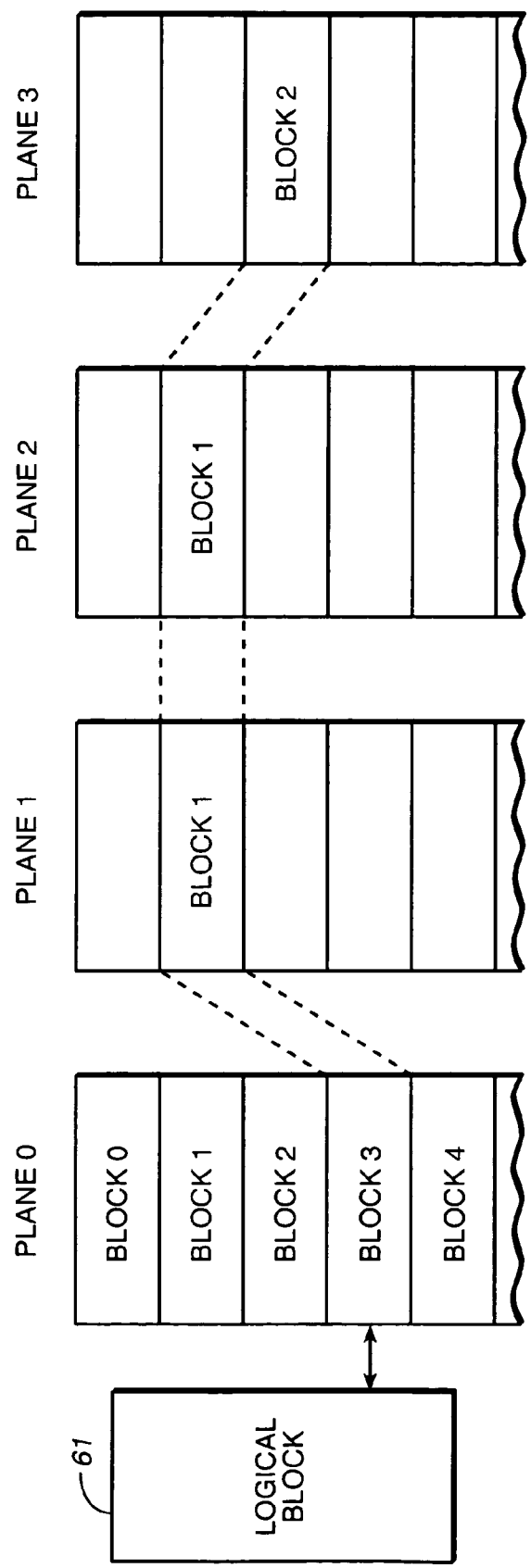
FIG._6

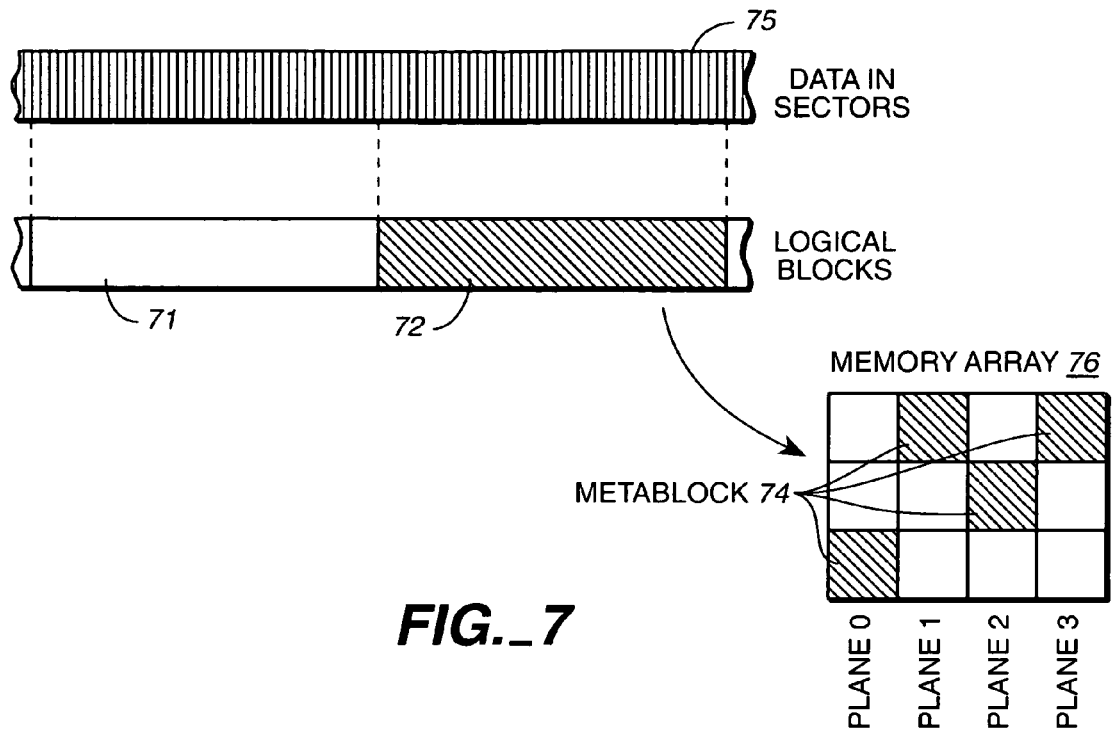
FIG._7
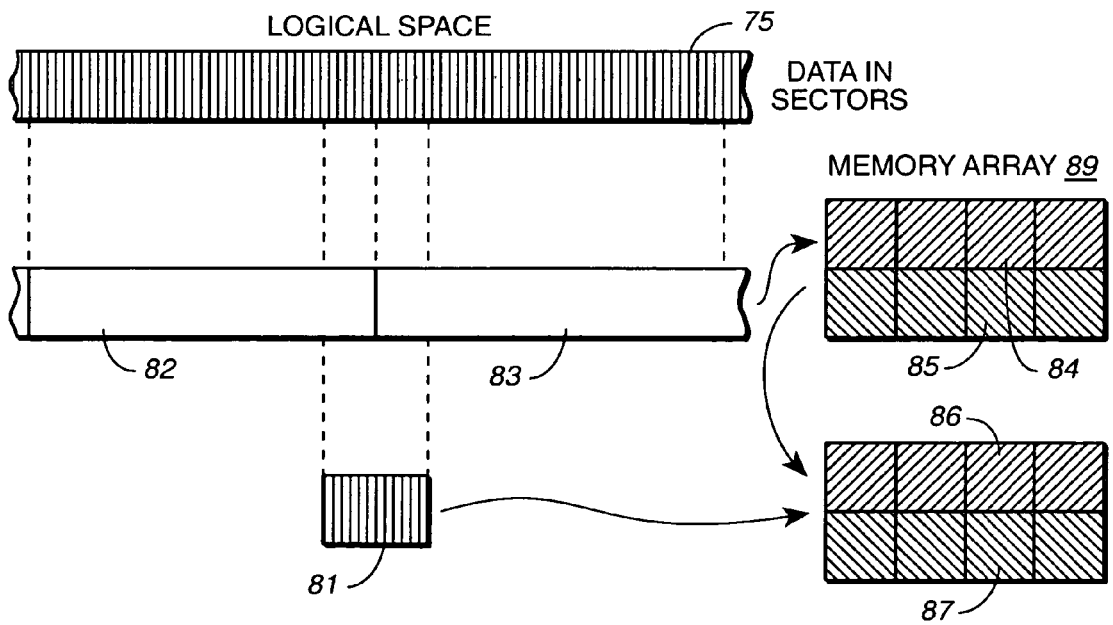
FIG._8

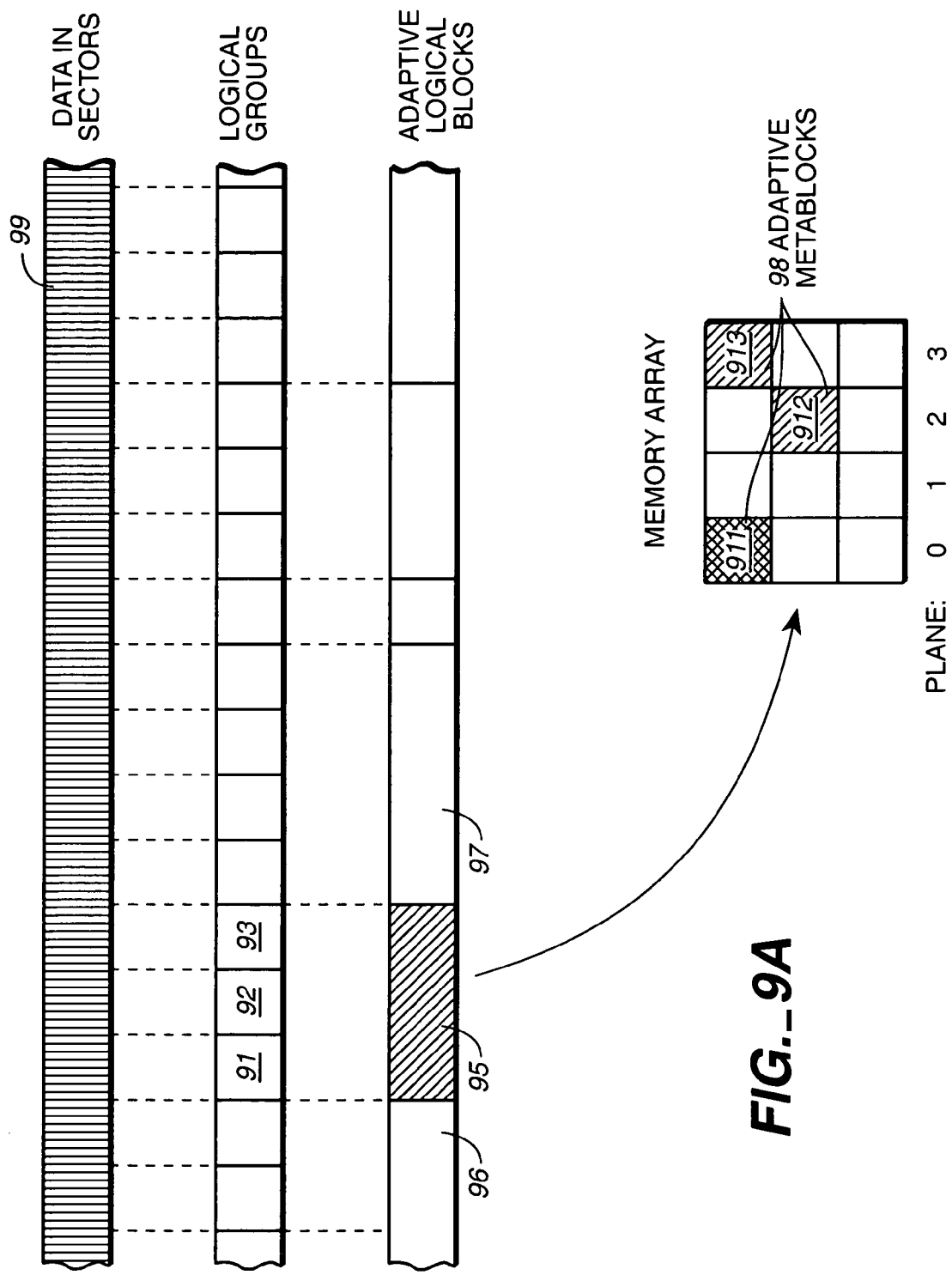
FIG._9A

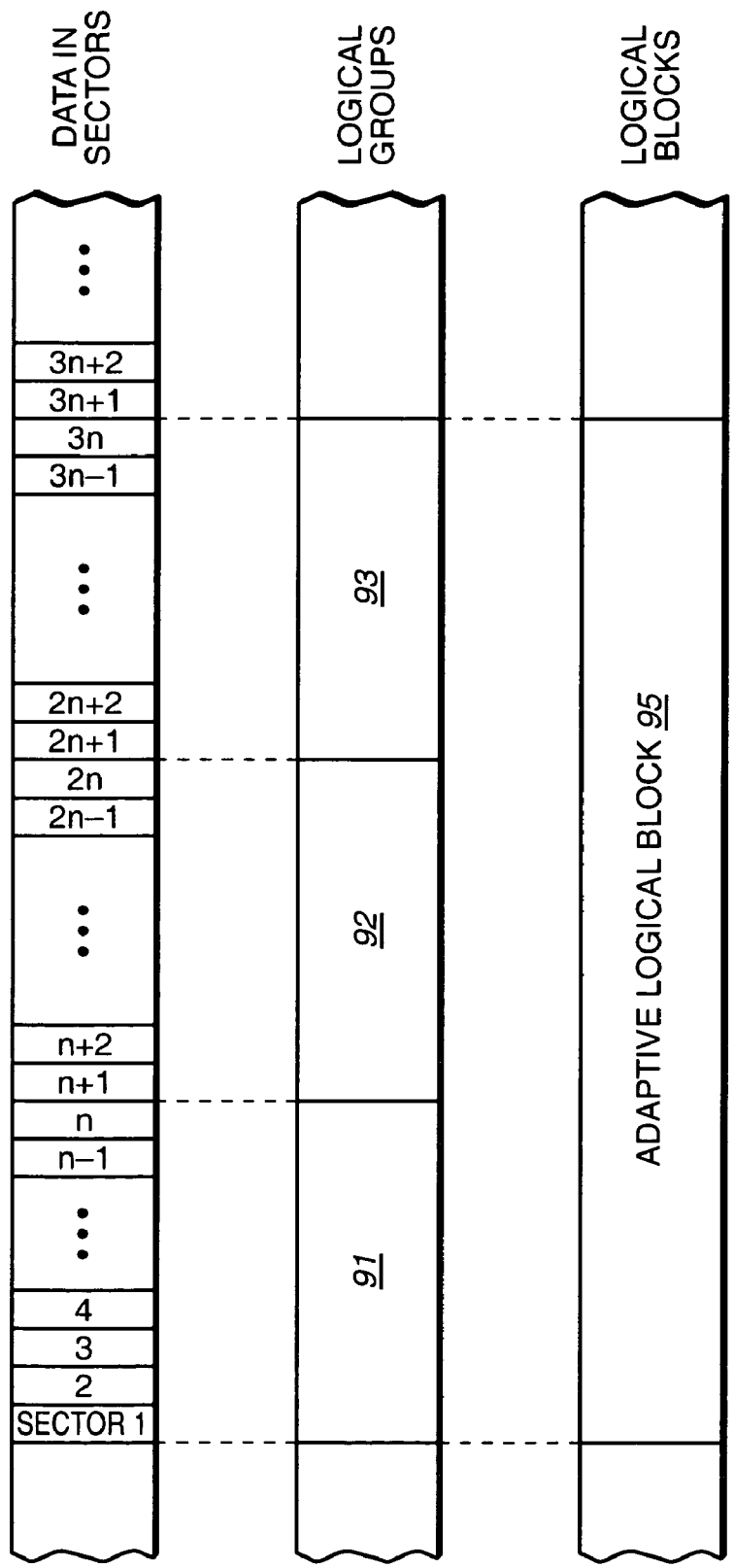
FIG._9B

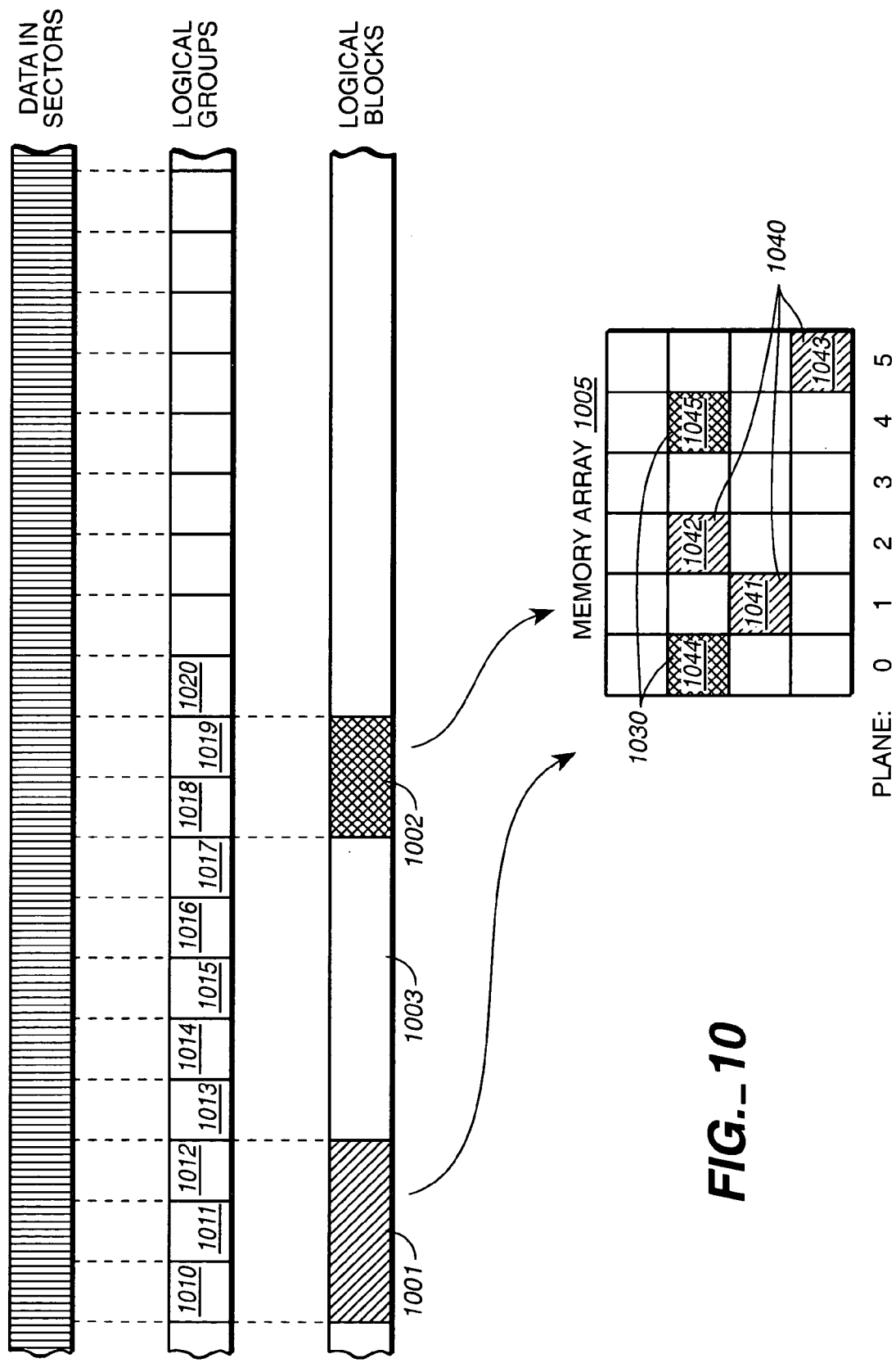
FIG._10

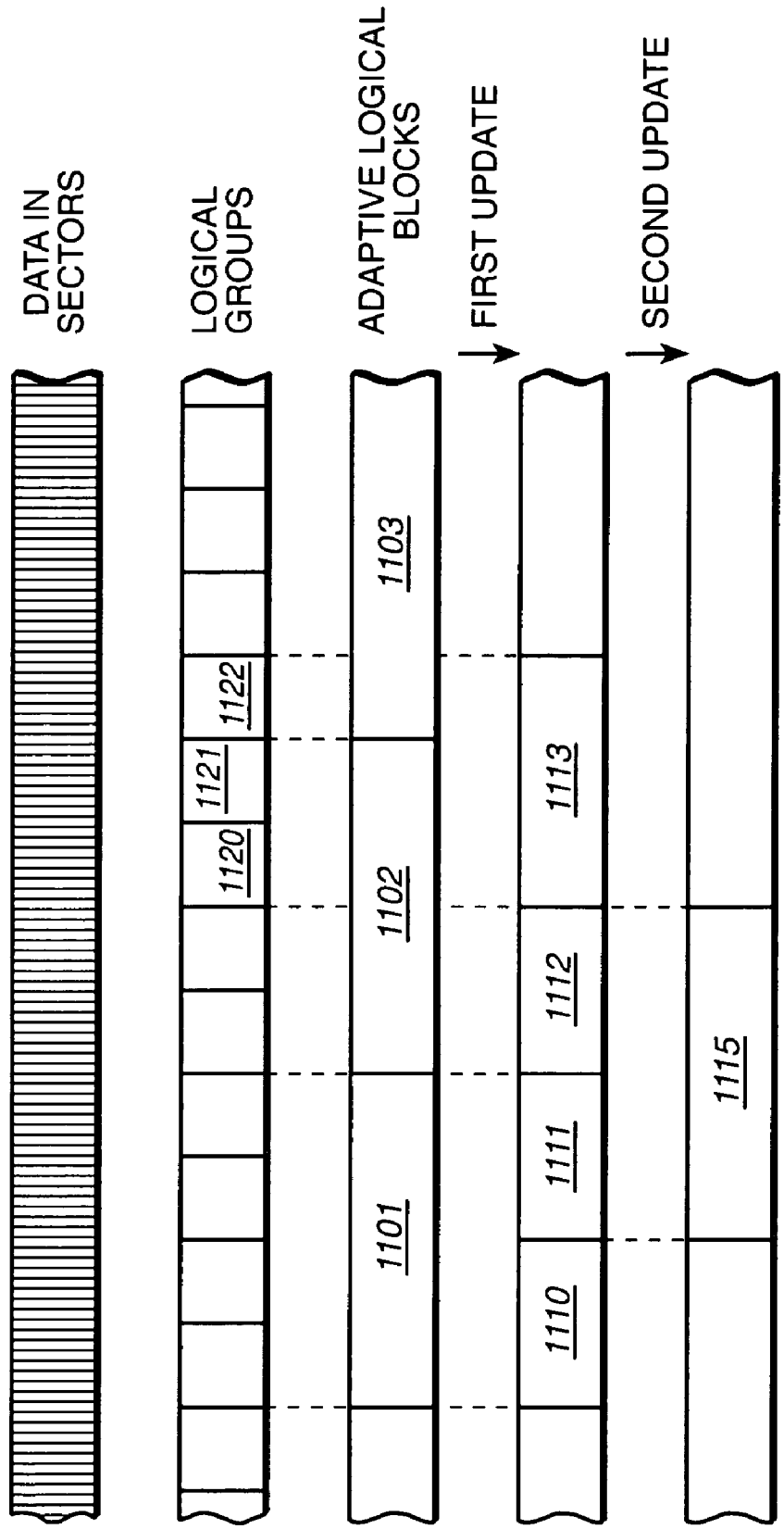
FIG._11

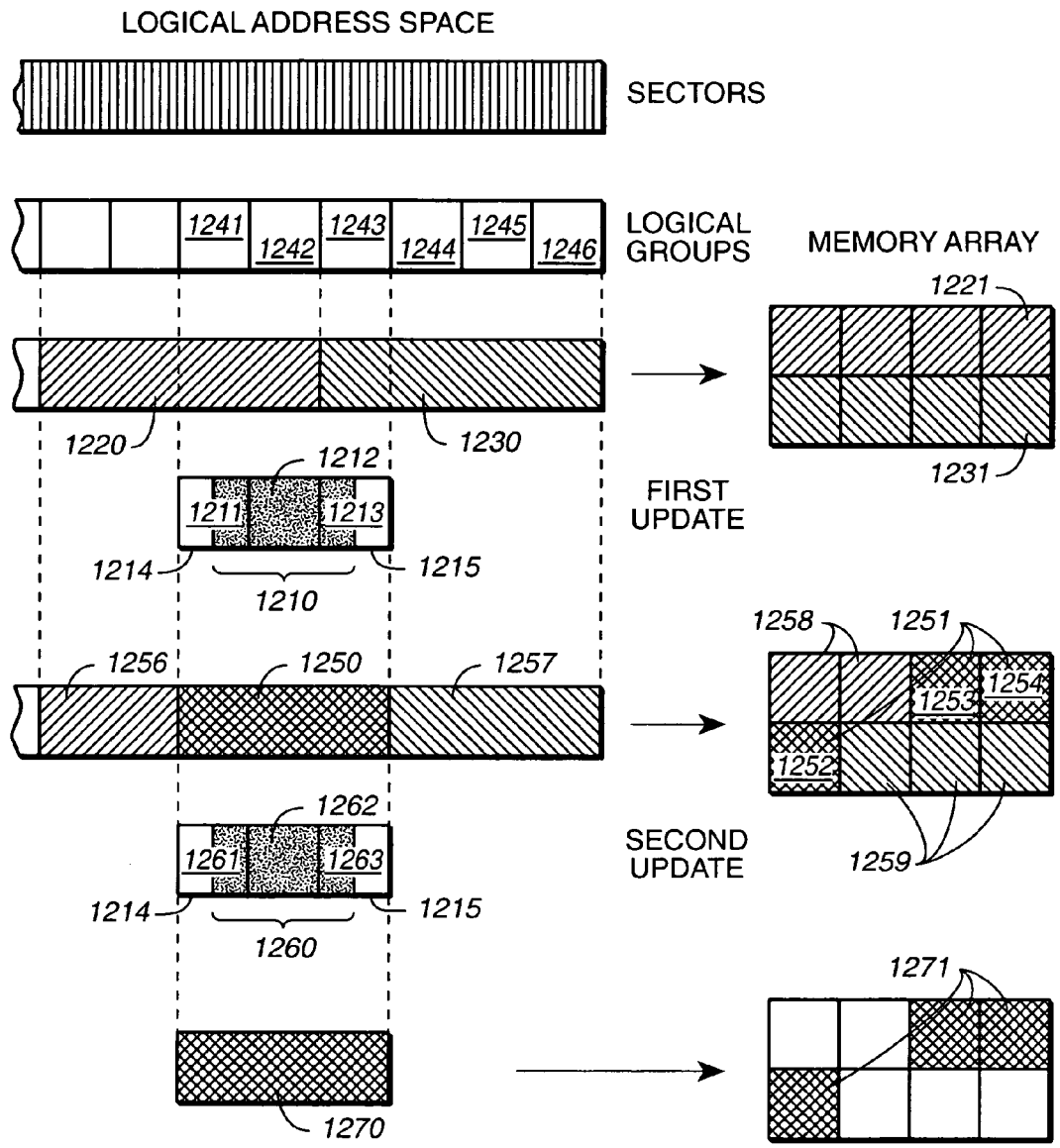
FIG._12A

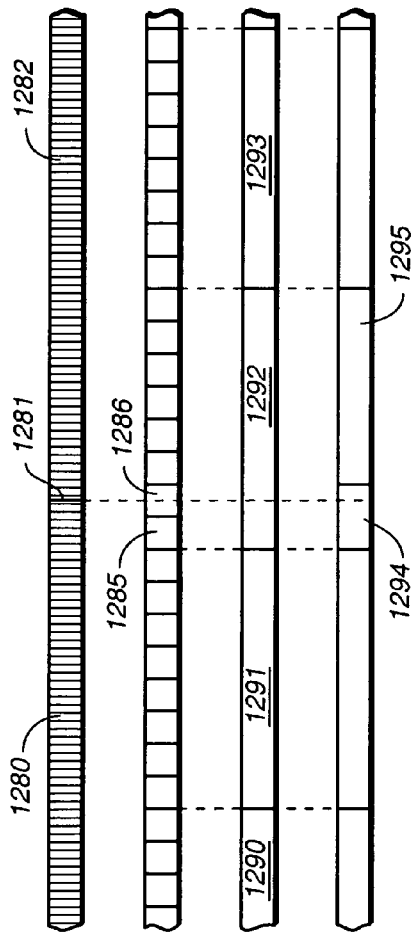
FIG._12B
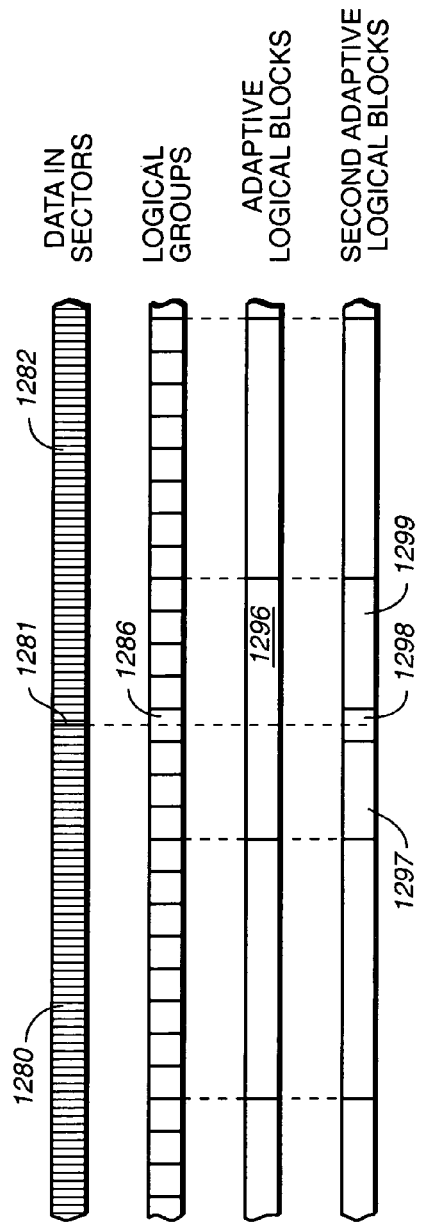
FIG._12C

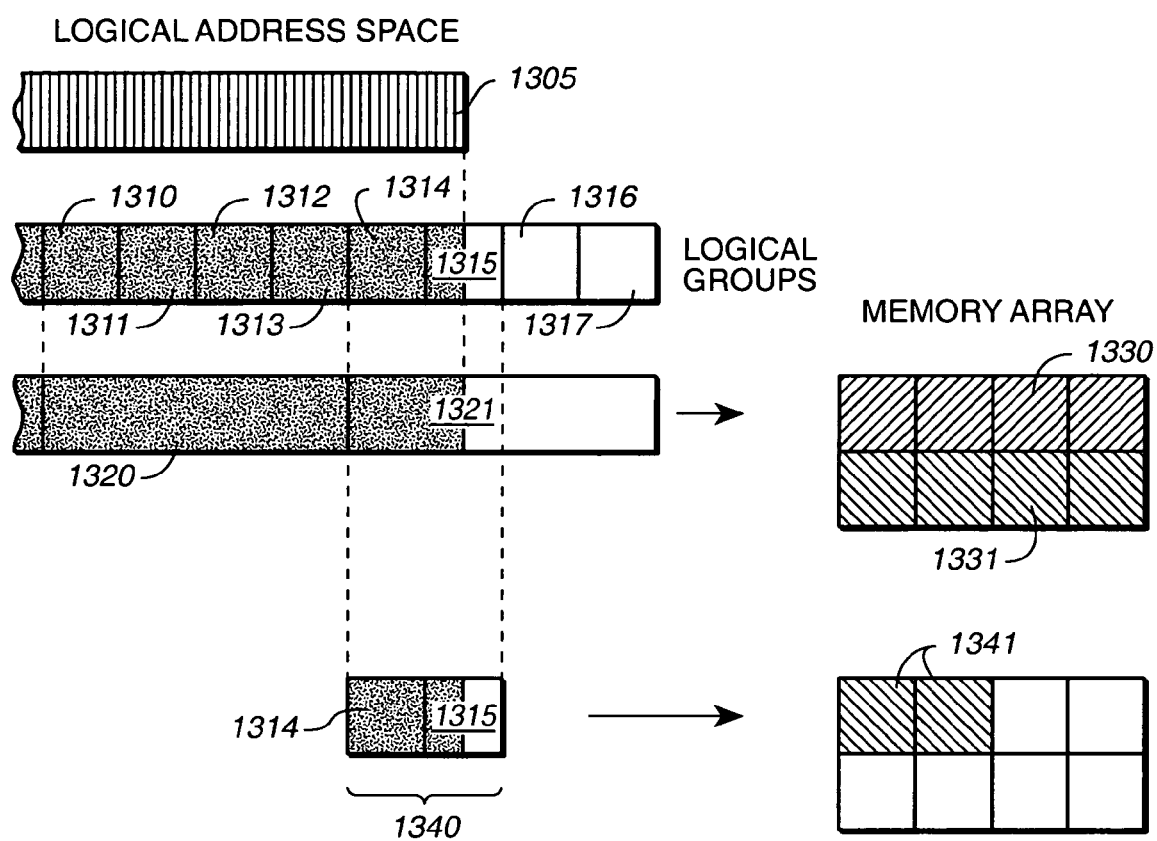
FIG._13

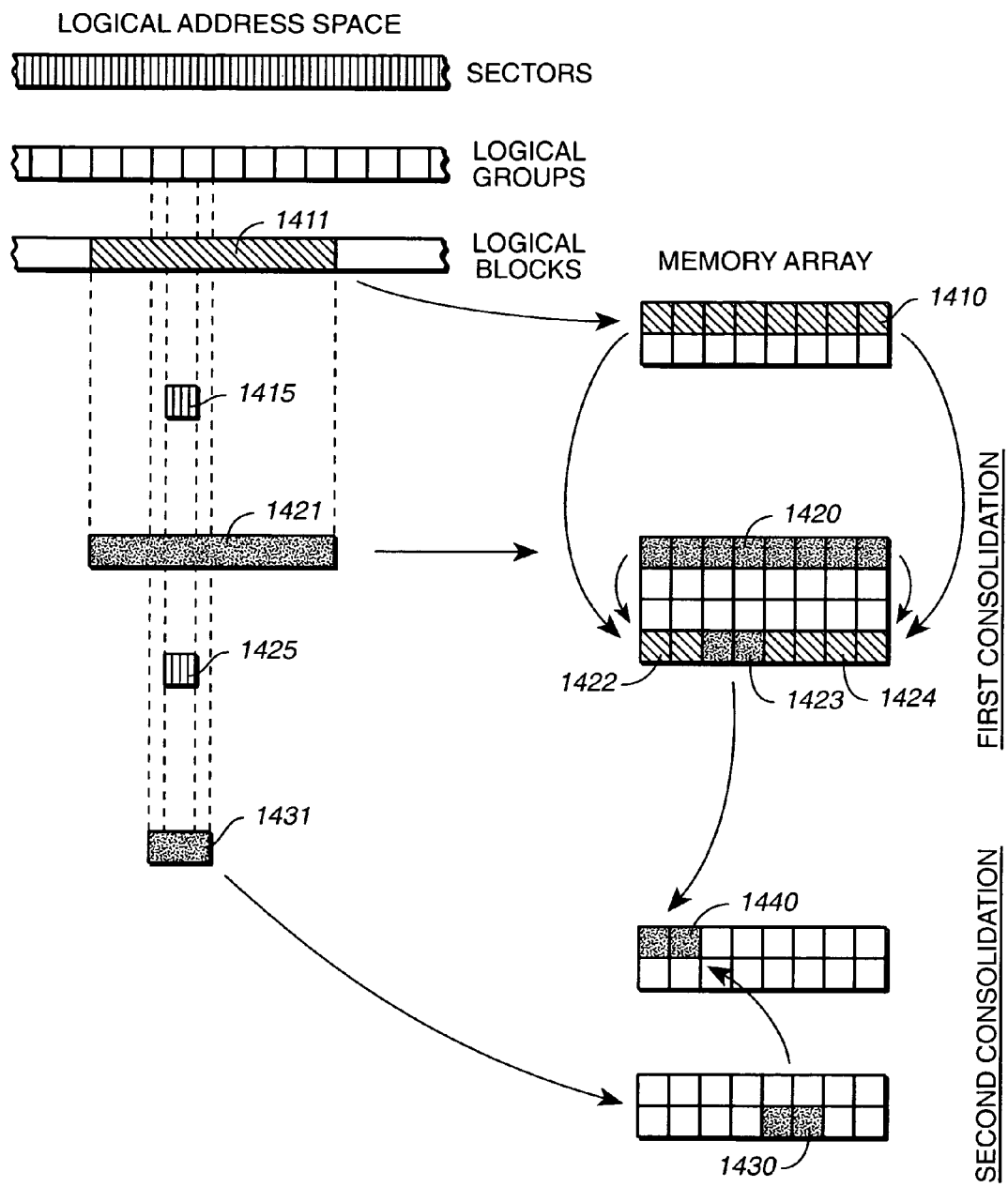
FIG._14

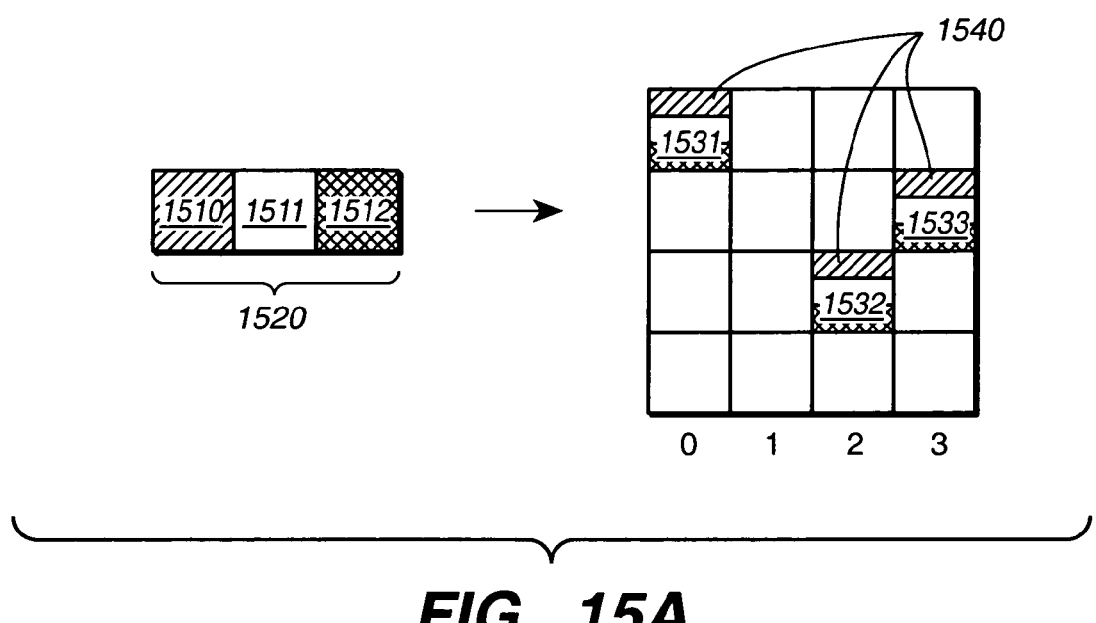
FIG._15A

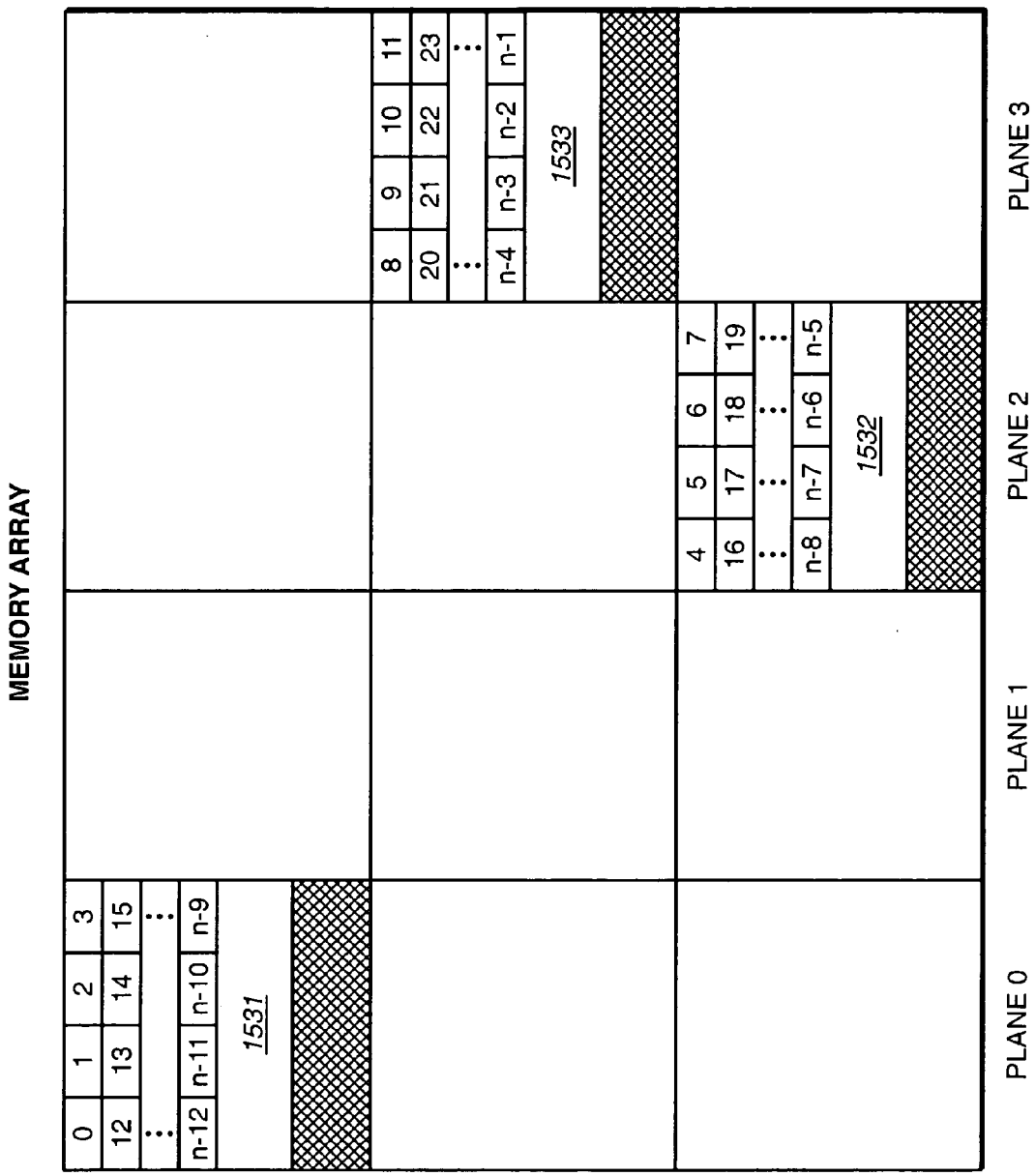
FIG._15B

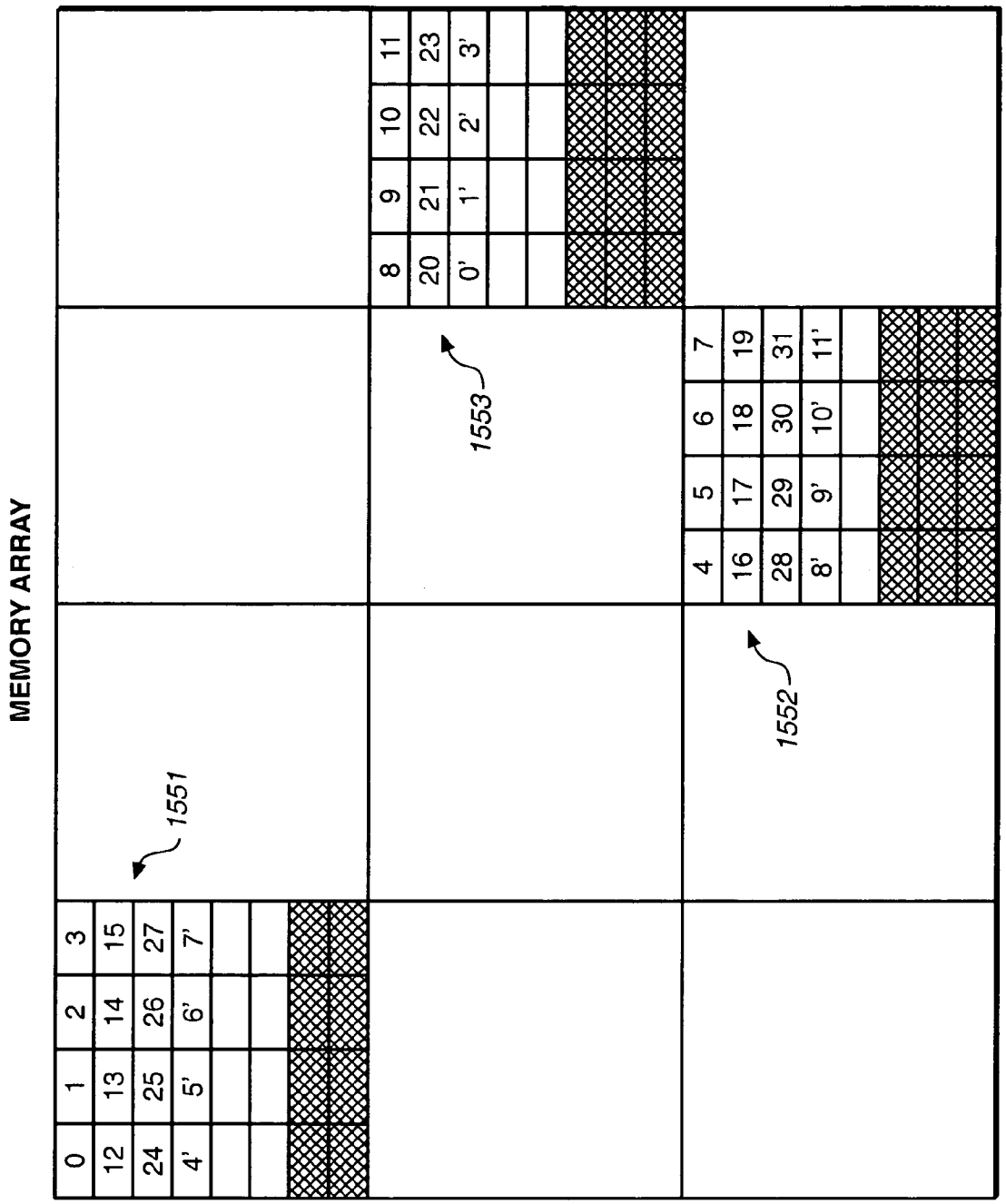
FIG._15C

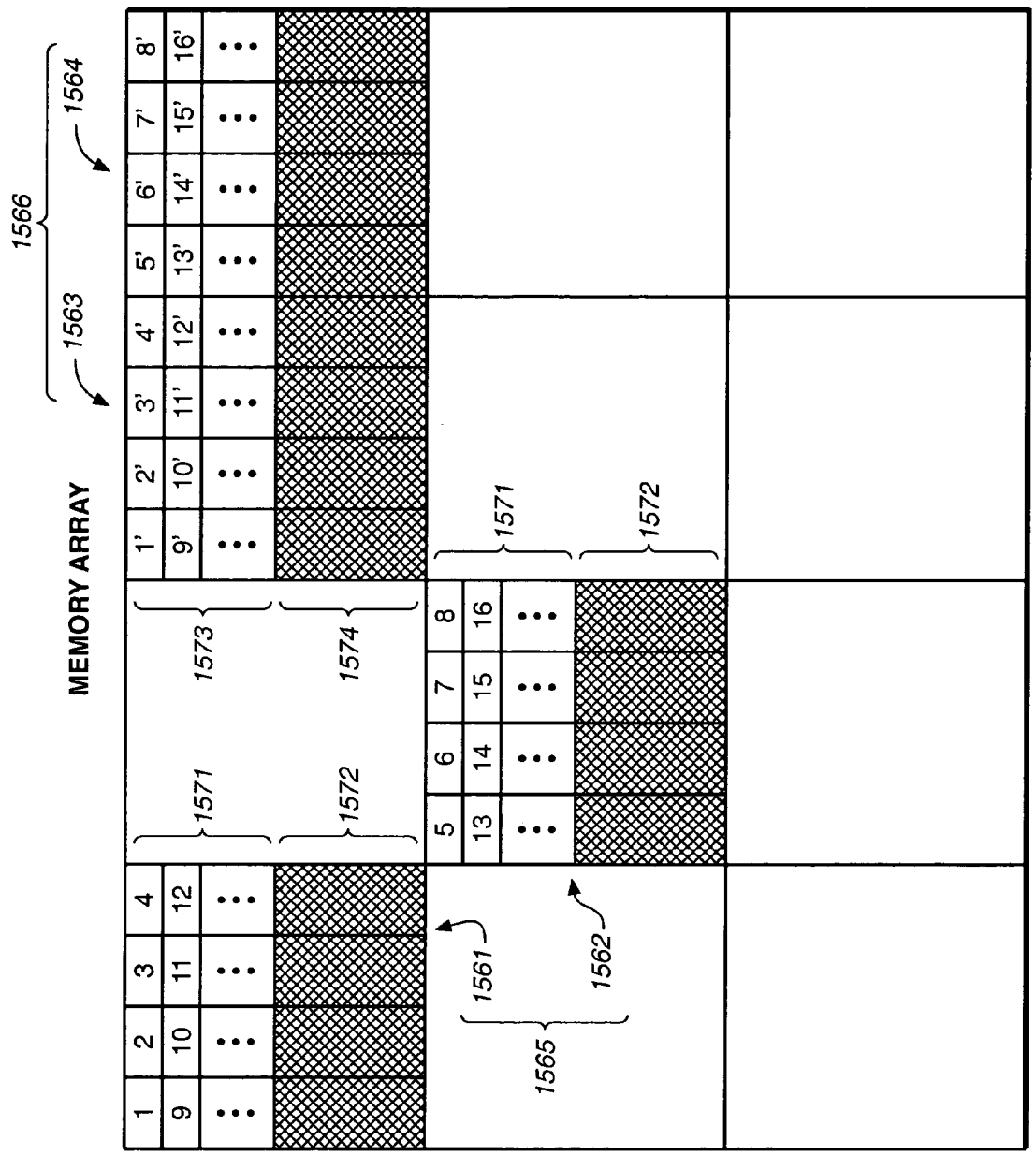
FIG._15D

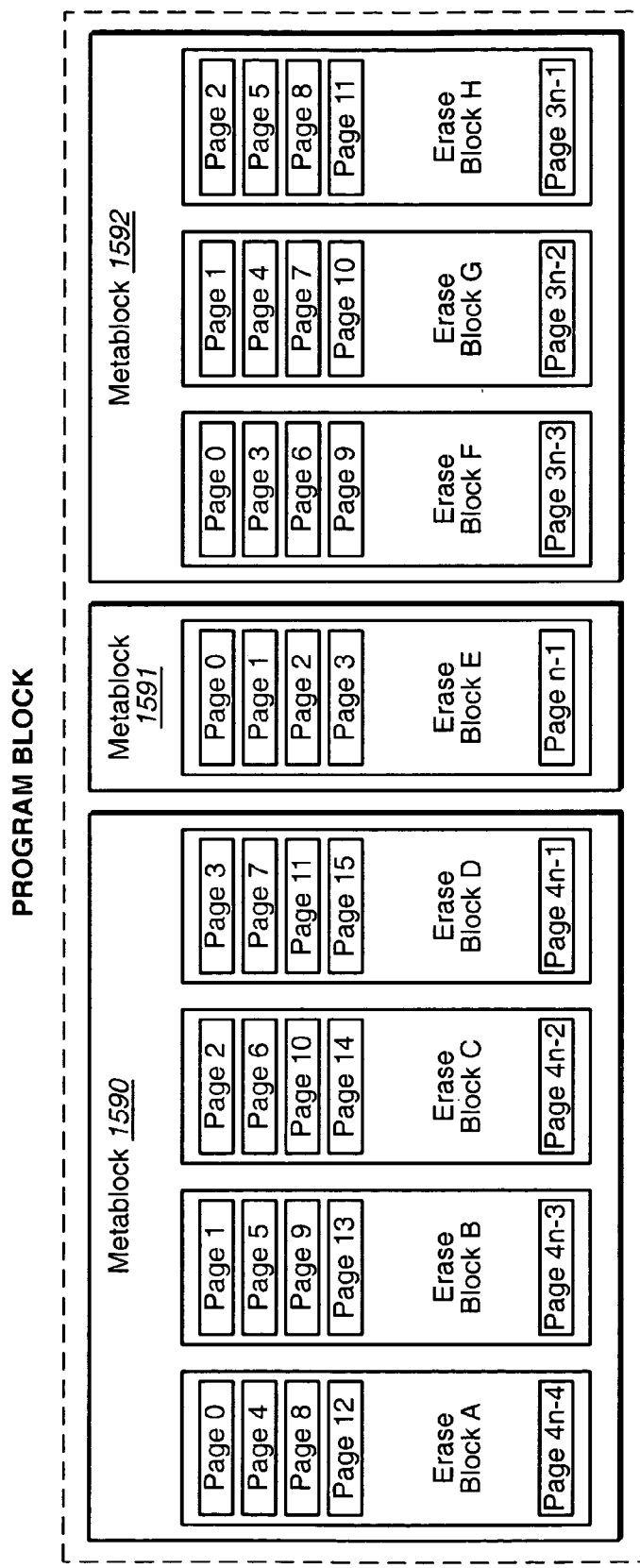
FIG._15E

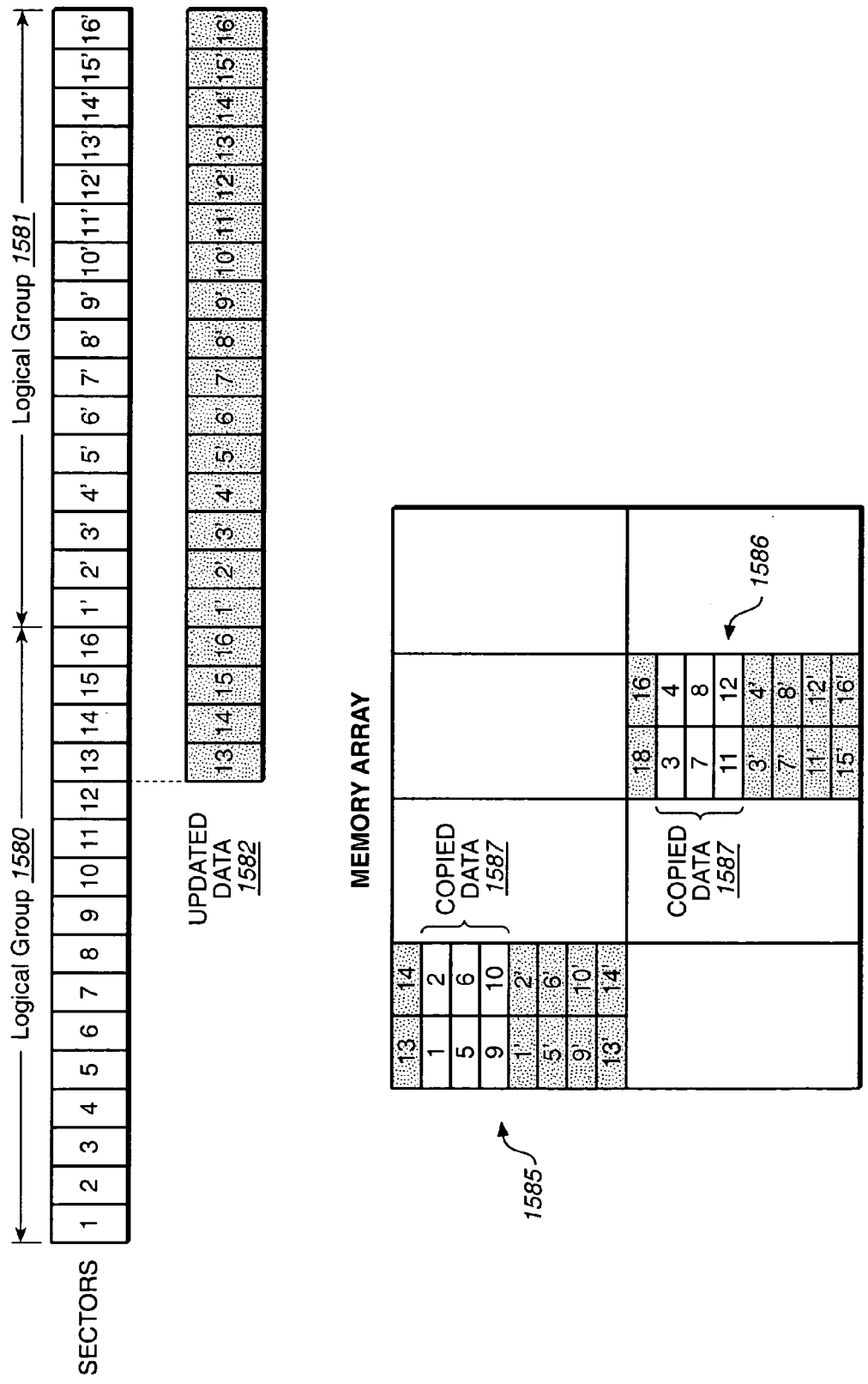
FIG._15F

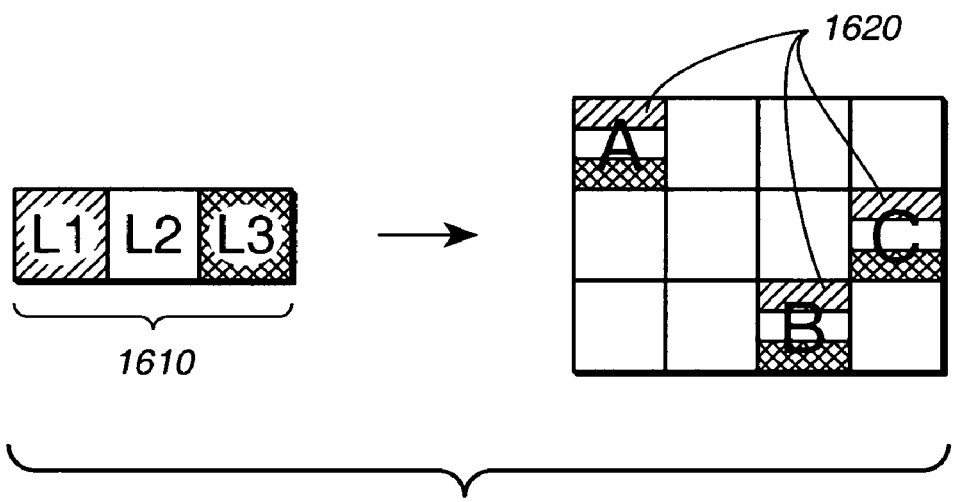
FIG._16

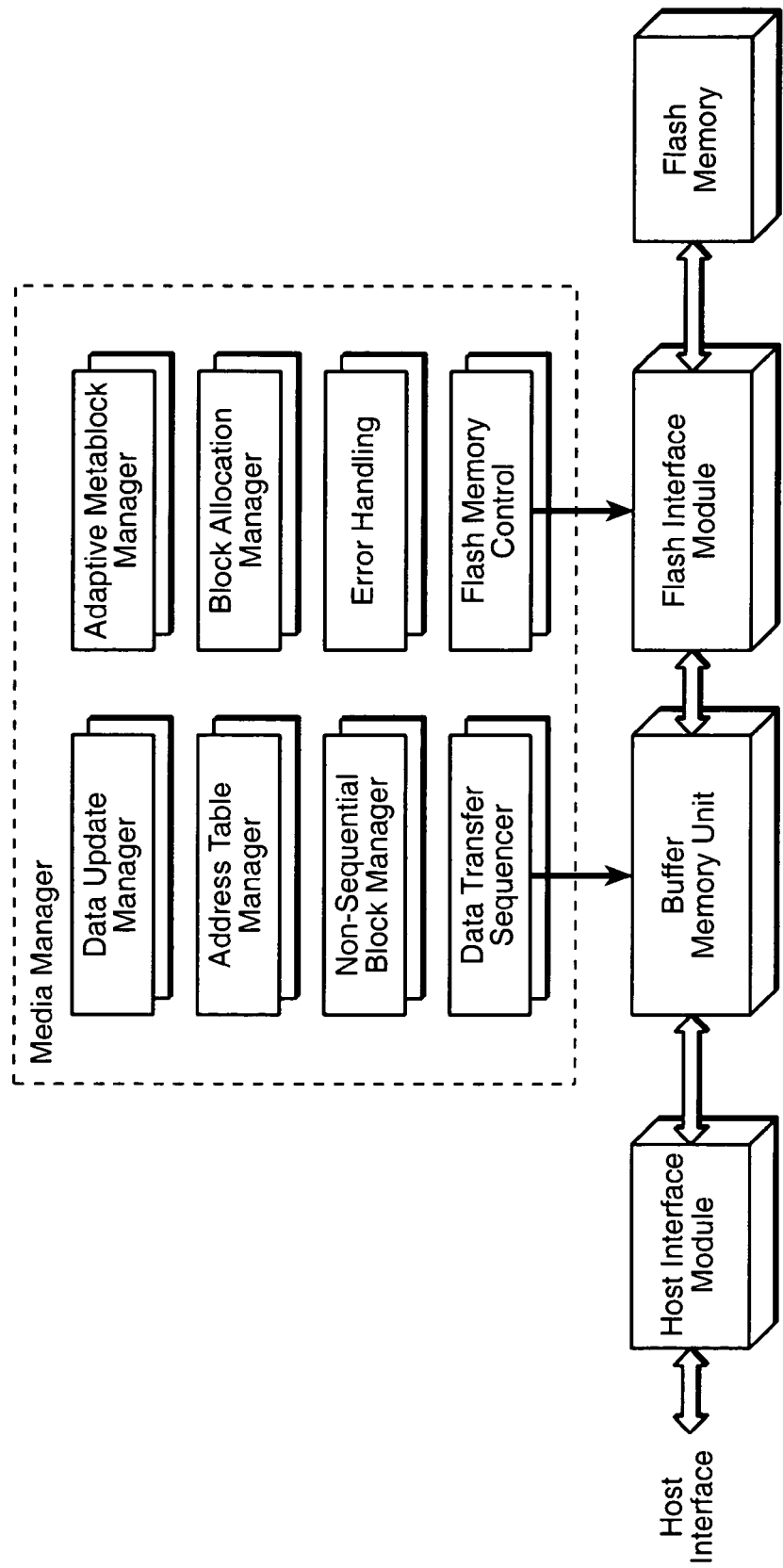
FIG._17

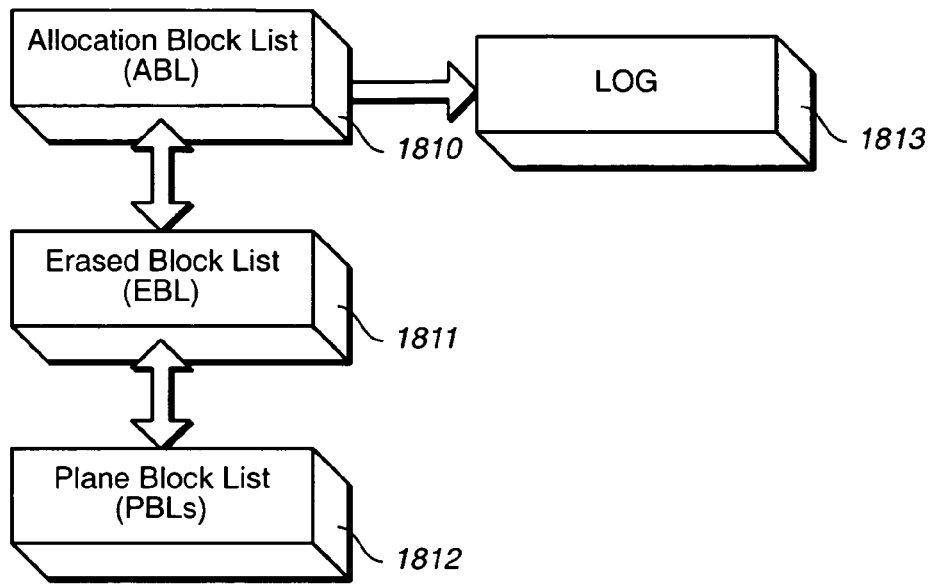
FIG._18A
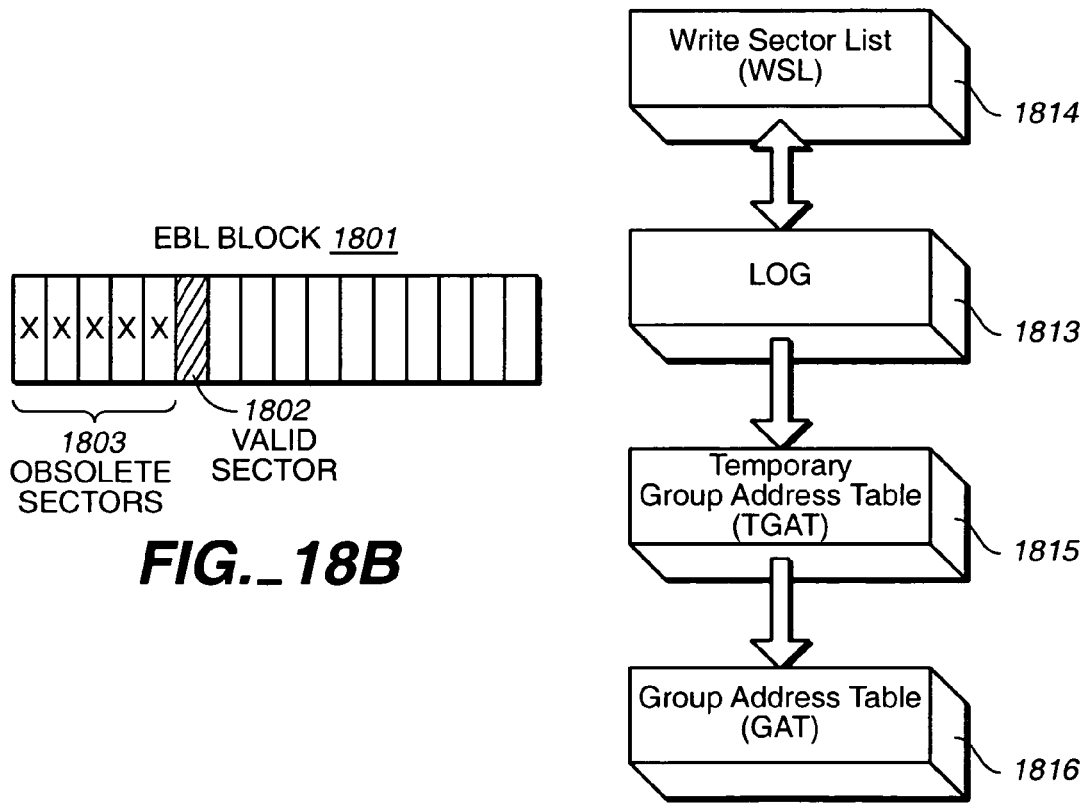
FIG._18B
FIG._18C

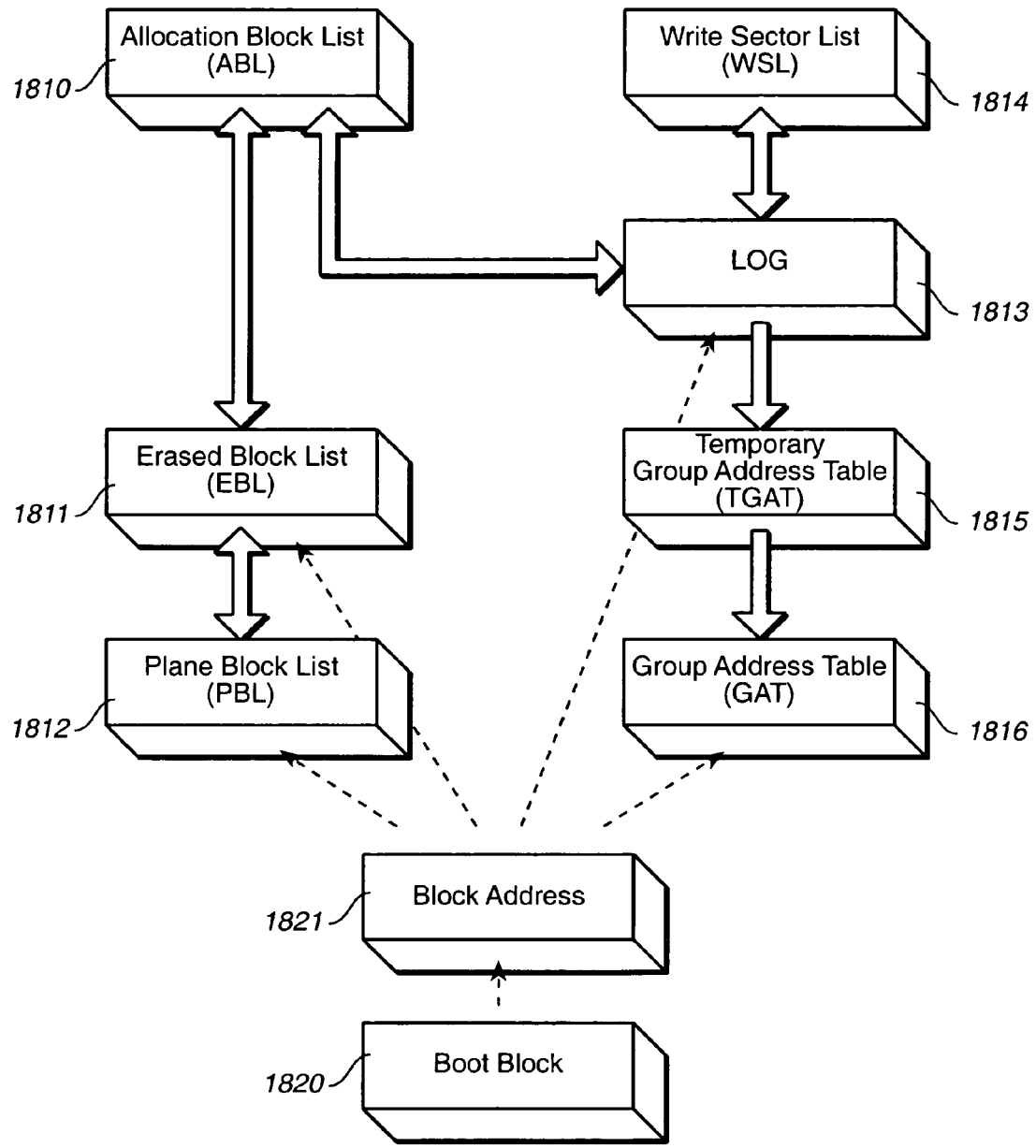
FIG._18D

ADAPTIVE METABLOCKS

BACKGROUND

This invention relates generally to the operation of non-volatile memory systems, and, more specifically, to the handling of data within such memory systems.

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are CompactFlash™ (CF) cards, MultiMedia cards (MMC), Secure-Digital (SD) cards, Smart Media cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. Besides the memory card implementation, this type of memory can alternatively be embedded into various types of host systems.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, and 6,522,580.

The charge storage elements of current flash EEPROM arrays, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements are described in United States patent application publication no. 2003/0109093 of Harari et al.

Individual flash EEPROM cells store an amount of charge in a charge storage element or unit that is representative of one or more bits of data. The charge level of a storage element controls the threshold voltage (commonly referenced as $V_T$) of its memory cell, which is used as a basis of reading the storage state of the cell. A threshold voltage window is commonly divided into a number of ranges, one for each of the two or more storage states of the memory cell. These ranges are separated by guardbands that include a nominal sensing level that allows determining the storage states of the individual cells. These storage levels do shift as a result of charge disturbing programming, reading or erasing operations performed in neighboring or other related memory cells, pages or blocks. Error correcting codes (ECCs) are therefore typically calculated by the controller and stored along with the host data being programmed and used during reading to verify the data and perform some level of data correction if necessary. Also, shifting charge levels can be restored back to the centers of their state ranges from time-to-time, before disturbing operations cause them to shift completely out of their defined ranges and thus cause erroneous data to be read. This process, termed data refresh or scrub, is described in U.S. Pat. Nos. 5,532,962 and 5,909,449.

As in most all integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage, unit or element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned United States patent application publication no. 2003/0109093. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the erase block is the erase unit, a minimum number of cells that are simultaneously erasable. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored. Such memories are typically configured with 16, 32 or more pages within each erase block, and each page stores one or just a few host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the erase blocks of each of the four zones. Logical block addresses are constrained, in a typical implementation, such that the data of each are never written outside of a single physical zone into which the logical block addresses are mapped. In a memory cell array divided into planes (sub-arrays), which each have their own addressing, programming and reading circuits, each zone preferably includes erase blocks from multiple planes, typically the same number of erase blocks from each of the planes. Zones are primarily used to simplify address management such as logical to physical translation, resulting in smaller translation tables, less RAM memory needed to hold these tables, and faster access times to address the currently active region of memory, but because of their restrictive nature can result in less than optimum wear leveling.

To further efficiently manage the memory, erase blocks may be linked together to form virtual blocks or metablocks. That is, each metablock is defined to include one erase block from each plane. Use of the metablock is described in international patent application publication no. WO 02/058074. The metablock is identified by a host logical block address as a destination for programming and reading data. Similarly, all erase blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

Data stored in a metablock are often updated, the likelihood of updates occurring in a metablock increases as the data capacity of the metablock increases. Updated sectors of one metablock are normally written to another metablock. The unchanged sectors are usually also copied from the original to the new metablock, as part of the same programming operation, to consolidate the data. Alternatively, the unchanged data may remain in the original metablock until later consolidation with the updated data into a single metablock again.

Copying unchanged sectors may add to the time required for copying and adds to the space occupied by the data in the memory array because the original metablock may not be used until an erase operation is performed. Copying of unchanged sectors is a result of logical fragmentation of host files into different metablocks. Where a metablock contains portions of two host files, updating one of the files also involves copying the portion of the other file that is stored in the same metablock. As metablocks become larger, the portions being copied also become larger. Thus, logical fragmentation becomes a greater problem as metablocks become larger.

It is common to operate large block or metablock systems with some extra erase blocks maintained in an erased block pool. When one or more pages of data less than the capacity of an erase block are being updated, it is typical to write the updated pages to an erase block from the pool and then copy data of the unchanged pages from the original erase block to erase pool block. Variations of this technique are described in aforementioned published international application no. WO 02/058074. Over time, as a result of host data files being re-written and updated, many erase blocks can end up with a relatively few number of its pages containing valid data and remaining pages containing data that is no longer current. In order to be able to efficiently use the data storage capacity of the array, logically related data pages of valid data are from time-to-time gathered together from fragments among multiple. erase blocks and consolidated together into a fewer number of erase blocks. This process is commonly termed "garbage collection."

SUMMARY OF THE INVENTION

Data may be stored in a memory array in adaptive metablocks. The size of an adaptive metablock may be tailored to the data to be stored. Adaptive metablock size may be determined based on the nature of the data (control data, data from host) or may be determined based on boundaries within the data, such as boundaries between files. Configuring adaptive metablocks according to the data reduces the effects logical fragmentation.

Logical groups that contain data equal to the data in one erase block of a memory array are formed from logically sequential sectors. Adaptive logical blocks are formed from logical groups. Adaptive logical blocks may contain different numbers of logical groups. Individual adaptive logical blocks are stored in individual adaptive metablocks in a memory array. The number of erase blocks in an adaptive metablock is equal to the number of logical groups in the corresponding adaptive logical block. Thus, an adaptive metablock has a variable number of erase blocks. The erase blocks of a metablock may be from fewer than all the planes of the memory array. More than one adaptive metablock may be programmed at one time. Adaptive metablocks may be formed according to the data to be stored. Large adaptive metablocks may be used to attain a high degree of parallelism during programming. Smaller adaptive metablocks may be used to allow efficient updating of stored data.

Adaptive logical blocks may be formed so that boundaries between adaptive logical blocks reflect boundaries in the data, for example boundaries between files or streams of data. By tailoring adaptive logical blocks in this way, copying of data within the memory array may be reduced. Where data is updated, a new adaptive logical block may be formed to hold the updated data with a small amount of old data. Thus, if the same data is updated again, there is only a small amount of old data that needs to be copied.

Where an adaptive logical block is partially filled, the data may be copied to a smaller adaptive logical block. This may be done before the partially filled adaptive logical block is programmed or it may be done after the partially filled adaptive logical block is programmed in an adaptive metablock, in which case the adaptive metablock containing the partially filled adaptive logical block is marked as obsolete. The smaller adaptive logical block is programmed to a smaller adaptive metablock in the memory array. Thus, there is a saving of space in the memory array.

In architectures that use non-sequentially updated metablocks (chaotic blocks) to hold update data, an adaptive metablock may be used instead. The size of the adaptive metablock may be selected according to the logical address range that is being updated. If the adaptive metablock is tailored to a particular logical address range, updates in that range may be performed more efficiently because there is less copying of data.

Formation of adaptive metablocks and recording the location of stored data is performed by a media manager. A media manager maintains records of available erase blocks. Records of locations of stored data are also maintained by the media manager. Records of locations of stored data are maintained in tables (or lists) have an entry for each logical group. The entry for each logical group indicates the size of the adaptive metablock (and corresponding adaptive logical block) containing the logical group, the position of the logical group within its adaptive logical block and the physical location of one of the erase blocks of the metablock.

BRIEF DESCRIPTION OF THE DRAWINGS

FIGS. 1A and 1B are block diagrams of a non-volatile memory and a host system, respectively, that operate together;

FIG. 2 illustrates a first example organization of the memory array of FIG. 1A;

FIG. 3 shows an example host data sector with overhead data as stored in the memory array of FIG. 1A;

FIG. 4 illustrates a second example organization of the memory array of FIG. 1A;

FIG. 5 illustrates a third example organization of the memory array of FIG. 1A;

FIG. 6 shows an example of a metablock in a memory array such as that of FIG. 5;

FIG. 7 shows an example of a logical block being stored in a metablock such as shown in FIG. 6;

FIG. 8 shows a data update where original data is stored in a metablocks in a memory array;

FIG. 9A shows an adaptive logical block being stored in an adaptive metablock in a memory array;

FIG. 9B shows logical mapping of sectors to logical groups and logical groups to adaptive logical blocks of 9A;

FIG. 10 shows parallel programming of two adaptive logical blocks to two adaptive metablocks;

FIG. 11 shows logical groups mapped to adaptive logical blocks in various configurations;

FIG. 12A shows data stored in adaptive logical blocks being updated and stored in new adaptive logical blocks.

FIG. 12B shows an example of adaptive logical blocks remapped to fit data streams;

FIG. 12C shows another example of adaptive logical blocks remapped to fit data streams;

FIG. 13 shows a partially filled adaptive logical block remapped to a smaller adaptive logical block;

FIG. 14 shows an adaptive logical block used for updating data that is adapted to the logical address range being updated;

FIG. 15A shows an adaptive logical block stored in an adaptive metablock of a memory array;

FIG. 15B shows sectors of a logical group of the adaptive logical block of FIG. 15A stored in a memory array;

FIG. 15C shows another example of sectors of a logical group stored in a memory array;

FIG. 15D shows an example of the arrangement of sectors where two adaptive metablocks are programmed in parallel;

FIG. 15E shows an example of the programming of three metablocks in parallel and the resulting arrangement of pages within the metablocks;

FIG. 15F shows an example of updating data where the first updated sector is not the first sector in an adaptive metablock;

FIG. 16 shows a table recording the locations of logical groups stored in an adaptive metablock of a memory array;

FIG. 17 shows a media manager that may be used to manage adaptive metablock architecture;

FIG. 18A is a block diagram showing an example of erased block management hierarchy;

FIG. 18B shows an EBL block comprising multiple sectors including one valid sector and multiple obsolete sectors;

FIG. 18C is a block diagram showing an example of address table management hierarchy;

FIG. 18D shows data structure including boot addresses and boot block.

DESCRIPTION OF EXEMPLARY EMBODIMENTS

Memory Architectures and Their Operation

Referring initially to FIG. 1A, a flash memory includes a memory cell array and a controller. In the example shown, two integrated circuit devices (chips) 11 and 13 include an array 15 of memory cells and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. A memory cell array may be located on a single chip or may be comprised of memory cells on multiple chips. The controller and part or the entire array can alternatively be combined onto a single integrated circuit chip but this is currently not an economical alternative.

A typical controller 19 includes a microprocessor 21, a read-only-memory (ROM) 23 primarily to store firmware and a buffer memory (RAM) 25 primarily for the temporary storage of user data either being written to or read from the memory chips 11 and 13. Buffer memory 25 may be either volatile or non-volatile memory. Circuits 27 interface with the memory array chip(s) and circuits 29 interface with a host though connections 31. The integrity of data is in this example determined by calculating an ECC with circuits 33 dedicated to calculating the code. As user data is being transferred from the host to the flash memory array for storage, the circuit calculates an ECC from the data and the code is stored in the memory. When that user data are later read from the memory, they are again passed through the circuit 33, which calculates the ECC by the same algorithm and compares that code with the one calculated and stored with the data. If they compare, the integrity of the data is confirmed. If they differ, depending upon the specific ECC algorithm utilized, those bits in error, up to a number supported by the algorithm, can be identified and corrected.

The connections 31 of the memory of FIG. 1A mate with connections 31' of a host system, an example of which is given in FIG. 1B. Data transfers between the host and the memory of FIG. 1A are through interface circuits 35. A typical host also includes a microprocessor 37, a ROM 39 for storing firmware code and RAM 41. Other circuits and subsystems 43 often include a high capacity magnetic data storage disk drive, interface circuits for a keyboard, a monitor and the like, depending upon the particular host system. Some examples of such hosts include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, network routers and others.

The memory of FIG. 1A may be implemented as a small enclosed card containing the controller and all its memory array circuit devices in a form that is removably connectable with the host of FIG. 1B. That is, mating connections 31 and 31' allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1A may be embedded within the host of FIG. 1B, wherein the connections 31 and 31' are permanently made. In this case, the memory is usually contained within an enclosure of the host along with other components. As a further alternative, a memory chip such as memory chip 11 may connect directly to connections 31' of the host system without a memory controller between them. In this case, the functions of the memory controller are performed by microprocessor 37 of the host system.

FIG. 2 illustrates a portion of a memory array wherein memory cells are grouped into erase blocks, the cells in each erase block being erasable together as part of a single erase operation, usually simultaneously. An erase block is the minimum unit of erase.

The size of the individual memory cell erase blocks of FIG. 2 can vary but one commercially practiced form includes a single sector of data in an individual erase block. The contents of such a data sector are illustrated in FIG. 3. User data 51 are typically 512 bytes. In addition to the user data 51 are overhead data that includes an ECC 53 calculated from the user data, parameters 55 relating to the sector data and/or the erase block in which the sector is programmed and an ECC 57 calculated from the parameters 55 and any other overhead data that might be included. Alternatively, a single ECC may be calculated from both user data 51 and parameters 55.

The parameters 55 may include a quantity related to the number of program/erase cycles experienced by the erase block, this quantity being updated after each cycle or some number of cycles. When this experience quantity is used in a wear leveling algorithm, logical block addresses are regularly re-mapped to different physical block addresses in order to even out the usage (wear) of all the erase blocks. Another use of the experience quantity is to change voltages and other parameters of programming, reading and/or erasing as a function of the number of cycles experienced by different erase blocks.

The parameters 55 may also include an indication of the bit values assigned to each of the storage states of the memory cells, referred to as their "rotation". This also has a beneficial effect in wear leveling. One or more flags may also be included in the parameters 55 that indicate status or states. Indications of voltage levels to be used for programming and/or erasing the erase block can also be stored within the parameters 55, these voltages being updated as the number of cycles experienced by the erase block and other factors change. Other examples of the parameters 55 include an identification of any defective cells within the erase block, the logical address of the data that is mapped into this physical block and the address of any substitute erase block in case the primary erase block is defective. The particular combination of parameters 55 that are used in any memory system will vary in accordance with the design. Also, some or all of the overhead data can be stored in erase blocks dedicated to such a function, rather than in the erase block containing the user data or to which the overhead data pertains.

Different from the single data sector erase block of FIG. 2 is a multi-sector erase block of FIG. 4. An example erase block 59, still the minimum unit of erase, contains four pages 0-3, each of which is the minimum unit of programming. One or more host sectors of data are stored in each page, usually along with overhead data including at least the ECC calculated from the sector's data and may be in the form of the data sector of FIG. 3.

Re-writing the data of an entire erase block usually involves programming the new data into an available erase block of an erase block pool, the original erase block then being erased and placed in the erase pool. When data of less than all the pages of an erase block are updated, the updated data are typically stored in a page of an erase block from the erased block pool and data in the remaining unchanged pages are copied from the original erase block into the new erase block. The original erase block is then erased. Variations of this large block management technique include writing the updated data into a page of another erase block without moving data from the original erase block or erasing it. This results in multiple pages having the same logical address. The most recent page of data is identified by some convenient technique such as the time of programming that is recorded as a field in sector or page overhead data.

A further multi-sector erase block arrangement is illustrated in FIG. 5. Here, the total memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices, an example being to form each plane from one or more distinct integrated circuit devices. Each erase block in the example system of FIG. 5 contains 16 pages P0-P15, each page having a capacity of one, two or more host data sectors and some overhead data.

Metablocks

Yet another memory cell arrangement is illustrated in FIG. 6. Each plane contains a large number of erase blocks. In order to increase the degree of parallelism of operation, erase blocks within different planes are logically linked to form metablocks. One such metablock is illustrated in FIG. 6. Each metablock is logically addressable and the memory controller assigns and keeps track of the erase blocks that form the individual metablocks. The host system provides data in the form of a stream of sectors. This stream of sectors is divided into logical blocks. Here, a logical block is a logical unit of data that contains the same number of sectors of data as are contained in a metablock of the memory array. The memory controller maintains a record of the location where each logical block is stored. Such a logical block 61 of FIG. 6, for example, is identified by a logical block addresses (LBA) that is mapped by the controller into the physical block numbers (PBNs) of the blocks that make up the metablock. All blocks of the metablock are erased together, and pages from each block are generally programmed and read simultaneously.

FIG. 7 shows data being stored in a memory array. Data is sent by a host in the form of a stream of sectors of data 75. The sectors are formed into logical blocks 71, 72. Logical blocks are then programmed to metablocks. For example, logical block 72 is programmed to metablock 74. FIG. 7 shows a memory array 76 having four planes. Metablock 74 has one erase block from each of planes 0, 1, 2 and 3. Metablock 74 extends across all planes of the array so that all planes may be programmed in parallel. Thus, the size of a metablock is typically determined by the number of planes in the array. Also, the size of corresponding logical blocks is determined by this size.

FIG. 8 shows data being updated in a memory array where data is stored in metablocks. Updated data sectors 81 are received from a host to be stored in a memory array. Updated data sectors 81 correspond to original data sectors in logical blocks 82, 83. Original data in logical blocks 82, 83 are stored in metablocks 84, 85 in the memory array 89. Thus, some of the sectors in metablock 84 and some of the sectors in metablock 85 need to be updated while others do not. Updating may be done by combining updated data sectors 81 with original sectors in metablocks 84, 85 that do not need to be updated. These combined data are then written to replacement metablocks 86, 87 and original metablocks 84, 85 are marked as obsolete. Obsolete metablocks 84, 85 are eventually erased and made available again during garbage collection. Combining the updated data sectors 81 with the original sectors may be done when the data is received. Alternatively, sectors of updated data 81 may be written to another location and may be combined with original data at a later time as part of garbage collection. While large metablocks allow faster programming because of greater parallelism, updating data stored in large metablocks may involve copying large amounts of data even where only a small amount of new data is received. Consolidating new data and original data in a metablock may impose a significant overhead during garbage collection.

Adaptive Metablock

FIG. 9A shows an example of an adaptive metablock 98 used to store data in a memory array. Data is received in the form of a stream of sectors of data 99. Sectors are formed into logical groups including logical groups 91, 92, 93. A logical group is a logical unit of data that is equal to the amount of data stored in one erase block of the memory array. A logical group is formed from logically sequential sectors received from the host. Each logical group is formed with a particular logical address range. Thus, a logical group is an intermediate logical unit of data that may contain many sectors but is generally smaller than an adaptive metablock Logical groups are formed into adaptive logical blocks. Adaptive logical blocks or logical blocks may also be referred to as "metagroups." The term "metagroup" is considered equivalent to the term "adaptive logical block." The term "adaptive logical block" is generally used in this application. An adaptive logical block contains a variable number of logical groups. Thus, in FIG. 9A adaptive logical block 95 contains 3 logical groups 91, 92, 93. Adaptive logical block 96 contains two logical groups and logical block 97 contains 4 logical groups. Adaptive logical block 95 is programmed to adaptive metablock 98. Adaptive logical block 95 contains three logical groups 91, 92, 93 and correspondingly, adaptive metablock 98 contains three erase blocks 911, 912, 913. Therefore, adaptive metablock 98 does not have erase blocks from each plane of the array, only from planes 0, 2 and 3. Adaptive metablock 98 has no erase block from plane 1. FIG. 9B shows in more detail how sectors are mapped to logical groups 91, 92, 93. Each logical group 91, 92, 93 contains n sectors of data. FIG. 9B also shows logical groups 91, 92, 93 mapped to adaptive logical block 95. An adaptive logical block is programmed to a corresponding sized adaptive metablock in the memory array.

In some examples of metablock architecture, metablock size is fixed. The number of planes in an array may determine the size of the metablock. In these examples, the size of logical blocks is also fixed and sectors are mapped to logical blocks in a predetermined fashion. Thus, the logical address space is divided into equal sized logical blocks having fixed logical address ranges and fixed boundary locations. In contrast, in architectures using adaptive metablocks, adaptive logical blocks do not have fixed sizes and adaptive logical blocks are not limited to predetermined ranges of logical address space. Instead, adaptive logical blocks may be of various sizes and may be formed to extend over different ranges of logical address space. The formation of logical groups facilitates adaptive metablock architecture by providing an intermediate data unit from which adaptive logical blocks of various sizes may be formed. Thus, an adaptive metablock is an example of a metablock that does not have fixed size and an adaptive logical block is an example of a logical block that does not have fixed size.

The planes used to form an adaptive metablock may be selected according to an algorithm that provides efficient use of the erase blocks of the array. Planes may be given different priority based on the number of available erase blocks in a plane and whether a particular plane is still busy from a previous operation. Also, consideration may be given to using the same planes for new material as is used for the material that is being updated so that a copy operation may be performed within the plane. Such copying of data within a plane (on-chip copy) may be more efficient in some architectures. Generally, the selection of particular erase blocks within the selected planes is not critical.

One result of having adaptive metablocks of different sizes is that some adaptive metablocks may not contain an erase block from every plane of the array. If such an adaptive metablock is programmed individually then programming does not use the maximum possible parallelism. For example, in FIG. 9A, plane 1 is not programmed in the operation shown. It is generally desirable to program with the maximum parallelism possible to increase programming speed. Programming to fewer planes results in inefficiency. This is especially true when adaptive metablocks are small but there are many planes in an array. However, maintaining high parallelism with smaller adaptive metablocks is possible by programming more than one adaptive metablock at a time.

FIG. 10 shows two adaptive metablocks 1030, 1040 being programmed in parallel. Data in metablocks 1030, 1040 may be updated data supplied by a host or data being relocated within flash memory. The memory array 1005 of FIG. 10 has 6 planes. Adaptive logical block 1001 contains three logical groups 1010-1012. Therefore, corresponding metablock 1040 requires three erase blocks 1041, 1042, 1043 from three planes of the memory array. If adaptive logical block 1001 was programmed on its own, only three planes would be used and the other three would be idle. However, adaptive logical block 1002 is programmed in parallel with adaptive logical block 1001 so that five out of six planes are used. Thus, a high degree of parallelism may be achieved even with adaptive metablocks containing much fewer erase blocks than the number of planes in the array.

An algorithm assigns planes according to various criteria so that adaptive logical block 1001 is programmed to erase blocks in planes 1, 2 and 5 while adaptive logical block 1002 is programmed to erase blocks in planes 0 and 4. No erase block in plane 3 is programmed in this operation. While maximum parallelism is desirable, all six planes may not be program med together in every programming operation. A plane may not be programmed if there are no erase blocks available in the plane. If very few erase blocks are available in the plane then it is assigned a low priority when planes are being selected for programming. Here, only five erase blocks are needed to store adaptive logical blocks 1001 and 1002. Therefore, only five planes are selected and plane 3 is not selected. Plane 3 is the plane with the lowest priority in this operation. However, the priority may be reassessed when the next program operation takes place. Priorities may have changed for the next operation because one more erase block in each of planes 0,1,2,4,5 has been used. Thus, plane 3 may be used in a subsequent programming operation if there are erase blocks available in plane 3. This algorithm balances the number of erase blocks used in different planes so that a particular plane does not fill up more rapidly and become unavailable.

The planes used for an individual adaptive metablock do not have to be physically adjacent. For example, an adaptive metablock 1030 of FIG. 10 has erase blocks 1044, 1045 in planes 0 and 4, while adaptive metablock 1040 has erase blocks 1041-1043 in planes 1, 2 and 5. Adaptive logical blocks programmed in parallel do not have to be logically sequential. Logically separated adaptive logical blocks may be programmed in parallel. For example, adaptive logical block 1001 and 1002 are not logically sequential. They are separated by adaptive logical block 1003.

When all data in an adaptive metablock had been superseded by updated or relocated versions of the data, and has become obsolete, the erase blocks forming the adaptive metablock should be erased. However, the adaptive metablock may not contain an erase block from every plane of the array and, when such an adaptive metablock is erased individually, erasure does not use the maximum parallelism. Maximum speed is therefore not achieved for erasing data and the effective programming speed of the memory system is therefore reduced from the maximum possible, since programming of data may not be carried out during an erase operation in flash memory chips in common use. This may be overcome by delaying erasure of erase blocks forming an adaptive metablock until one erase block from each plane is available, to achieve maximum erase parallelism. Erase blocks available for erasure are held in a list, and sets of blocks are periodically scheduled for erasure to achieve maximum possible parallelism. Erasure of a smaller set of blocks may be performed when the list contains no blocks in some planes.

FIG. 11 shows some possible data storage arrangements using adaptive metablocks. FIG. 11 shows mapping of incoming data in sectors to logical groups and mapping of logical groups to adaptive logical blocks. While this mapping is logical only, it will be understood that adaptive logical blocks may be programmed to adaptive metablocks of a memory array. Typically, data is first received as a stream of sectors that is stored using maximum parallelism. Thus, the memory system may behave like the system described in FIG. 7 during an initial write. FIG. 11 shows adaptive logical blocks 1101-1103, each adaptive logical block 1101-1103 having four logical groups. Thus, adaptive logical blocks 1101-1103 are of maximum size for a memory array having four planes.

At a later time, original adaptive logical blocks may be replaced with new adaptive logical blocks by remapping logical groups. For example, in the first update of FIG. 11, adaptive logical block 1101 is replaced by two adaptive logical blocks 1110 and 1111. Thus, a single adaptive logical block is replaced by two smaller adaptive logical blocks and a boundary between logical blocks is formed where previously there was no boundary. Adaptive logical block 1113 is created during the first update. Adaptive logical block 1113 includes logical group 1122 that was previously part of adaptive logical block 1103 and logical groups 1120, 1121 that were previously part of adaptive logical block 1102. Thus, adaptive logical block 1113 extends over a logical address range that previously contained a boundary between adaptive logical blocks 1102 and 1103. Adaptive logical blocks may also be combined to form larger adaptive logical blocks. In the second update of FIG. 11, logical groups 1111 and 1112 are combined to form logical group 1115. Here, adaptive logical block 1115 extends over a logical address range that was previously occupied by adaptive logical blocks 1111 and 1112. Thus, adaptive logical blocks may be formed from different combinations of adaptive logical groups. An adaptive logical block may be of any size from one logical group to a maximum number of logical groups. The maximum number of logical groups may be the number of planes in the array. The changes in adaptive logical block configuration may occur when data in one or more adaptive logical blocks is updated or may occur for some other reason. For example, adaptive logical block configuration may be updated as part of garbage collection or as a scheduled routine to optimize data storage.

Applications

FIG. 12A shows updating programmed data with new data so that subsequent updates are performed more efficiently. Frequently, a portion of new data less than a programmed adaptive metablock is received and is used to update programmed data. FIG. 12A shows new data 1210 that corresponds to portions of two adaptive logical blocks 1220, 1230. The new data has an address range that extends over the boundary between adaptive logical block 1220 and adaptive logical block 1230. Thus, adaptive metablocks 1221, 1231 corresponding to adaptive logical blocks 1220 and 1230 require updating.

New data 1210 extends over a logical address range that is within the address range of three sequential logical groups 1241, 1242 and 1243. Each of logical groups 1241-1243 has at least some portion that is to be updated. FIG. 12A shows logical group 1241 and 1243 having both data to be replaced and data that is not to be replaced. Logical group 1242 has only data that is to be replaced. New logical groups 1211, 1212 and 1213 are formed from new data 1210 and portions of original data 1214 and 1215 from logical groups 1241 and 1243. A new adaptive logical block 1250 is formed by logical groups 1211-1213. An adaptive metablock 1251 corresponding to adaptive logical block 1250 is formed from three erase blocks 1252-1254 in the memory array. Adaptive logical blocks 1256 and 1257 are formed from logical groups in which there are no new data. For example, adaptive logical block 1257 is formed from logical groups 1244-1246. Logical groups 1244-1246 may be copied from adaptive metablock 1231 in the memory array. Adaptive logical block 1257 is programmed to adaptive metablock 1259. Adaptive logical block 1256 is programmed to adaptive metablock 1258. Thus, three adaptive logical blocks 1250, 1256 and 1257 are formed in a logical address range previously occupied by two adaptive logical blocks 1220, 1230. Three adaptive metablocks 1251, 1258, and 1259 are formed in a memory array to store this data.

FIG. 12A shows a second update of new data occurring after the first update. New data 1260 consist of a stream of sectors having a logical address range that is the same logical address range as that of new data 1210. This situation is frequently encountered in non-volatile memory systems. The same range of data may be updated repeatedly because of the nature of the data stored (e.g. tables such as FATs, directories and sub-directories, an index within an application file). The second update only replaces data in adaptive logical block 1250. Thus, only adaptive logical block 1250 and corresponding adaptive metablock 1251 are updated in the second update. Adaptive logical block 1250 includes only three logical groups 1211-1213. Adaptive logical blocks 1256 and 1257 do not require updating. New data 1260 does not extend across the entire logical address range of adaptive logical block 1250 so portions of original. data 1214, 1215 are copied in order to fill logical groups 1261 and 1263. Logical groups 1261, 1262 and 1263 are formed from new data 1260 and original data 1214, 1215. Adaptive logical block 1270 is formed from logical groups 1261-1263. Adaptive logical block 1270 is programmed to adaptive metablock 1271 in the memory array. There is much less copying of original data than in the first update. Only original data 1214 and 1215 is copied, the data in the adaptive logical blocks 1256 and 1257 is not copied in the second update. Thus, by creating adaptive logical blocks having boundaries that more closely match the logical boundaries of updated data, subsequent updates may be made more efficient.

FIG. 12B shows adaptive logical blocks being remapped. Here, a stream of data includes two files 1280 and 1282. File 1280 is separated from file 1282 by a file boundary 1281. Generally, when new data is written to a memory system it is received as a stream of sectors of data. There may be file boundaries in such a stream. In some architectures, such boundaries may be identified when the data is received and adaptive logical blocks may be configured accordingly. In other architectures, the positions of the file boundaries may be shown by a range of data that is updated by the host. FIG. 12B shows file boundary 1281 positioned within the logical address range of logical group 1286. During an initial programming operation data is formed into adaptive logical blocks 1290-1293. Logical blocks 1290-1293 each comprise eight logical groups, the maximum size for the memory array used. File boundary 1281 is positioned within adaptive logical block 1292. Updating file 1280 requires updating metablocks 1290, 1291 and 1292, even though there are less than two logical groups of file 1280 stored in adaptive metablock 1292. The logical groups of adaptive logical block 1292 are remapped to new adaptive logical blocks 1294 and 1295. Logical block 1294 consists of only logical groups 1285 and 1286. Thus, the logical groups that contain part of file 1280 form adaptive logical block 1294, while the logical groups that do not contain part of file 1280 form adaptive logical block 1295. Updating file 1280 does not require updating adaptive logical block 1295. Thus, where a file boundary is known to exist, adaptive logical blocks may be formed having boundaries that are adjusted to fit file boundaries.

FIG. 12C shows an alternative remapping of data from data streams 1280, 1282. Here, file boundary 1281 occurs in logical group 1286. Logical group 1286 is initially incorporated into logical block 1296. Updating file 1280 requires updating logical block 1296 even though more than half the data in logical block 1296 is not from file 1280. During updating, a second set of adaptive logical blocks is formed. Adaptive logical block 1296 is replaced by new adaptive logical blocks 1297, 1298, 1299. Adaptive logical block 1298 contains just one logical group of data. Updating either data stream 1280 or data stream 1282 requires updating adaptive logical block 1298 because boundary 1281 occurs within adaptive logical block 1298. Thus, some copying of old data is always performed because file boundary 1281 is not aligned with a boundary between logical groups. However, because adaptive metablock 1298 contains only one logical group, there is only a small amount of data to be copied compared with the situation where a larger metablock such as metablock 1296 is used. Thus, by reducing the size of an adaptive logical block that contains a file boundary, copying of data during updates may be reduced.

FIG. 13 shows a partially filled adaptive metablock 1321 being rewritten to a smaller adaptive metablock 1340 with less empty space. A stream of data may be received and programmed using maximum parallelism. For example, in an array having four planes, adaptive logical blocks comprising four logical groups may be formed and the data stored in metablocks or adaptive metablocks having four erase blocks. However, at the end of such a stream of data, an adaptive metablock may be only partially filled. Such an adaptive metablock occupies more of the memory array than is necessary for the data stored. FIG. 13 shows a stream of sectors of data 1305 being received. The data is mapped to logical groups including logical groups 1310-1315. Logical groups 1310-1317 are formed into adaptive logical blocks 1320, 1321 having four logical groups each. The end of the stream of sectors of data 1305 occurs at a logical address that is in the logical address range of logical group 1315. Adaptive logical block 1321 is formed from logical blocks 1314-1317. Logical groups 1314 and 1315 contain data from stream of sectors of data 1305. Logical groups 1316 and 1317 do not contain data. Thus, adaptive logical block 1321 contains empty logical groups 1316 and 1317 and partially filled logical group 1315. Adaptive logical block 1321 is programmed to adaptive metablock 1331. Adaptive metablock 1331 comprises four erase blocks of the memory array. Portions of adaptive metablock 1331 are not used because of the empty logical groups 1316 and 1317 and partially filled logical group 1315. This wastes space in the memory array. FIG. 13 shows adaptive logical block 1340 formed from logical groups 1314 and 1315. Adaptive logical block 1340 is programmed to adaptive metablock 1341 in the memory array. Thus, adaptive metablock 1341 contains the same data as in 1331 but occupies only half the space in the memory array (two erase blocks instead of four). Adaptive logical block 1340 and adaptive metablock 1341 may be formed by copying data from adaptive metablock 1331 in the memory array. When data in adaptive metablock 1331 is copied to adaptive metablock 1341, adaptive metablock 1331 may be marked as obsolete. Adaptive metablock 1331 may then be erased.

Copying of data from a partially full metablock to a smaller metablock may be triggered by an elapse of time from the receipt of the stream of sectors of data 1305. Copying may also be done as part of a garbage collection routine. A smaller adaptive metablock such as 1340 may be formed directly from received data if the end of the stream of sectors of data 1305 is detected while the stream of sectors of data 1305 is in a buffer. In this case, data is not first written to a larger adaptive metablock and then copied to a smaller metablock. Thus, there is no obsolete adaptive metablock to erase. In some architectures, a host may send a signal indicating where the end of the stream of data occurs. An adaptive logical block may then be formed to contain only logical groups that contain sectors from the stream of data.

In certain memory architectures, erase blocks or metablocks may be assigned for storing updated data. Examples of such erase blocks and metablocks are described in the patent application having an attorney docket number SNDK.247US0, entitled "Management of non-volatile memory systems having large erase blocks" by Conley et al, filed on the same date as the present application and hereby incorporated by reference in its entirety. Certain metablocks, designated as E1 and E2 may be used to store updated data for a plane of a memory array. Other erase blocks or metablocks, designated as dE1 may be assigned to receive updated data for a particular erase block or metablock. An adaptive metablock may be designated as E1, E2, or dE1. Such an adaptive metablock may be tailored to a logical address range that is updated frequently. By forming an adaptive metablock that has a size that is selected to fit the updated data, copying of original data may be reduced. E1 and dE1 receive update data and store them in a non-sequential manner. Update blocks (or metablocks, or adaptive metablocks) that store update data non-sequentially are considered chaotic blocks.

FIG. 14 shows the use of an adaptive metablock as a chaotic block having a size that is adapted to the logical address range of updated data. Data is stored in original adaptive metablocks including original adaptive metablock 1410. Typically, such original adaptive metablocks are of maximum size. An adaptive metablock 1420 is assigned to receive updated data corresponding to data in original adaptive metablock 1410. Adaptive logical blocks 1411 and 1421 correspond to original adaptive metablock 1410 and adaptive metablock 1420 respectively. Adaptive logical block 1421 has the same logical address range as adaptive logical block 1411. First update data 1415 have a logical address range within the logical address range of adaptive logical block 1411. Only a portion of the logical address range of original adaptive logical block 1411 is updated in the first update. First update data 1415 is non-sequential (chaotic). Thus, adaptive metablock 1420 becomes a chaotic block. Update data 1415 may comprise several streams of sectors within the logical address range shown. The same sectors may be updated several times. Eventually, metablock 1420 becomes full and must be consolidated.

During the first consolidation, only the most recent copy of each sector is copied to new adaptive metablocks 1422-1424. For updated data, the most recent copy comes from adaptive metablock 1420, for data that is not updated the most recent copy comes from adaptive metablock 1410. Consolidation combines data from adaptive metablock 1410 and adaptive metablock 1420 in logical sequence. The logical address range assigned to adaptive metablock 1423 includes the logical address range of first update data 1415. Adaptive metablocks 1422, 1424 contain only data that was not updated.

Second update data 1425 are received after the first consolidation. Second update data 1425 are within the same logical address range as first update data 1415. Second update data 1425 are assigned to a new adaptive logical block 1431 that is stored in adaptive metablock 1430. Adaptive logical block 1431 has the same logical address range as data stored in adaptive metablock 1423. Adaptive metablock 1430 may be updated chaotically and so become a chaotic block. When adaptive metablock 1430 is filled, the data in adaptive metablock 1430 and adaptive metablock 1423 are consolidated to adaptive metablock 1440. Adaptive metablock, 1440 then replaces adaptive metablock 1423 and adaptive metablock 1423 may be marked as obsolete. Adaptive metablocks 1422 and 1424 remain unchanged. A smaller logical address range is consolidated in the second consolidation than in the first so that there is less copying of unchanged data. Also, less space is required in the memory array because the adaptive metablock used for updates is smaller after the first consolidation. Further updates may be made within the same logical address range and may be consolidated as in the second consolidation.

Media Management

FIG. 15A shows how logical groups 1510, 1511, 1512 of an adaptive logical block 1520 are mapped to the erase blocks 1531, 1532, 1533 of an adaptive metablock 1540. Although the number of logical groups in an adaptive logical block 1520 is equal to the number of erase blocks in adaptive metablock 1540, an individual logical group is not directly mapped to an individual erase block in this example. Instead, data is stored so that a portion of each logical group 1510-1512 is stored in each erase block 1531-1533 of adaptive metablock 1541.

FIG. 15B shows the mapping of adaptive logical block 1520 to the memory array in more detail. FIG. 15B shows how sectors from logical group 1510 are programmed in the memory array. Logical group 1510 contains n sectors of data. Planes 0-4 of the memory array are each four sectors wide. In certain memory architectures, the four sectors extending across a plane of an array are programmed in parallel. Thus, four sectors form a page, which is the minimum unit of programming of the array. Sectors typically arrive sequentially and may be stored in registers prior to writing to the array. Sectors in all erase blocks of the adaptive metablock may be programmed in parallel. Thus, for example, sectors 0-11 may be programmed in parallel. Then, sectors 12-23 may be programmed in parallel. This continues until all the sectors in logical group 1510 have been programmed. Then, logical group 1511, 1512 are programmed in turn.

FIG. 15C shows an adaptive metablock formed by three erase blocks in a memory array. The arrangement of sectors within the memory is similar to that shown in FIG. 15B with the number n equal to 32. However, because 32 is not evenly divisible by 3, the sectors in a logical group are not evenly distributed between the erase blocks 1551-1553. The first logical group consists of sectors 0-31. These sectors are distributed with twelve sectors in erase block 1551, twelve sectors in erase block 1552 and eight sectors in erase block 1553. The first sector 0' of the second logical group is programmed in erase block 1553. Thus, logical groups may be programmed differently and may start in different erase blocks. Sectors from different logical groups may be programmed in parallel. For example, sectors 24-31 from the first logical group and sectors 0'-3' from a second logical group may be programmed in parallel.

FIG. 15D shows two metablocks being programmed in parallel. Erase blocks 1561 and 1562 form adaptive metablock 1565 and erase blocks 1563 and 1564 form adaptive metablock 1566. Adaptive metablocks 1565 and 1566 are each comprised of two erase blocks and therefore each adaptive metablock 1565, 1566 contains two logical groups of data. Adaptive metablock 1565 contains logical groups 1571 and 1572. Adaptive metablock 1566 contains logical groups 1573 and 1574. The programming of sectors of logical groups 1571 and 1573 is illustrated. Logical groups 1571 and 1573 are programmed in parallel. Thus, during a first write to the memory array, sectors 1-8 from logical group 1571 may be simultaneously programmed with sectors 1'-8' from logical group 1573. Subsequently, sectors 9-16 are simultaneously programmed with sectors 9'-16'. This continues until all the sectors in logical groups 1571 and 1573 are programmed. Then, logical groups 1572 and 1574 are similarly programmed.

FIG. 15E shows three adaptive metablocks programmed in parallel. Metablock 1590 comprises four erase blocks, metablock 1591 comprises one erase block and metablock 1592 comprises three erase blocks. Metablocks 1590-1592 are programmed in parallel. Because metablocks 1590-1592 comprise different numbers of erase blocks, the data are differently aligned in each of metablocks 1590-1592. FIG. 15E shows the alignment of pages within metablocks 1590-1592. A page may be a single sector, four sectors or some other number of sectors programmed as a unit of programming. Pages of data in different erase blocks that are on the same horizontal level in FIG. 15E are programmed in parallel. For example, pages 12-15 of metablock 1590, page 3 of metablock 1591 and pages 9-11 of metablock 1592 are programmed in parallel.

FIG. 15F shows an example of updating data where the first sector of updated data is not the first sector in a logical group. The first sector in updated data 1582 has logical address 13. Logical group 1580 is comprised of sectors having logical addresses 1-16. Updated data 1582 includes sectors from at least two logical groups and an adaptive metablock size of two erase blocks is selected to store the first two logical groups containing updated data 1582. Erase blocks 1585 and 1586 are selected to store the first two logical groups containing updated data 1582. The first sector of updated data 1582, having a logical address 13, is written to the first location in erase block 1585. The sector having a logical address 14 is written to the second location and so on until the last sector in the logical group, the sector with a logical address 16, is written. The data from logical group 1580 that is not updated is then copied into the memory array. Thus, there is an offset between the first sector in a logical group and the first sector stored in an adaptive metablock. The first sector of the next logical group may be written in the normal way so that within an adaptive metablock different logical groups may be written with different offsets. Thus, the sector with logical address 1' is the first sector written when updating logical group 1581.

FIG. 16 shows a table that is used to record the location of data within the memory array according to logical group where an adaptive logical block 1610 is stored in an adaptive metablock 1620. Column 1 indicates the identity of each individual logical group. This is a logical address that uniquely specifies a logical group. Logical groups are generally listed sequentially. Column 2 indicates the size of the adaptive metablock in which the logical group is stored. The size is simply the number of erase blocks in the adaptive metablock. Here, the metablock consists of three erase blocks so the size is three for all logical blocks. Column 3 gives the group number N of the logical group within the adaptive logical block. Logical groups are numbered sequentially according to logical address range. Thus, logical group L1 has N=1, L2 has N=2 and L3 has N=3. Column 4 gives the location of the Nth erase block in the adaptive metablock. This may be the physical block number (PBN) of the erase block. Because the number of logical groups in an adaptive logical block is equal to the number of erase blocks in an adaptive metablock, a complete record of the location of the erase blocks of an adaptive metablock may be formed by recording one erase block location for each logical group.

A table of the location of particular logical groups may be kept in volatile or non-volatile memory as part of media management of the memory system. A media management system may have various tables recording the location of available erase blocks and logical to physical mapping of data. A media manager manages the tables of the media management system. Typically, a media manager is implemented in firmware in a controller.

FIG. 17 shows an example of a media manager. The operation of media managers similar to that shown in FIG. 17 is described in U.S. Patent Publication No. 2005-0144360-Al, which application is hereby incorporated by reference in its entirety. The media manager includes an adaptive metablock manager, a block allocation manager and an address table manager. These three managers and their associated tables are of particular relevance to the management of adaptive metablocks and will be described further.

An adaptive metablock manager determines the number of logical groups to assemble to form an adaptive logical block and thus the number of erase blocks in an adaptive metablock. Where data is received from a host this determination may be based on several factors. Command sequences from the host may be evaluated and adaptive metablock size may be determined based on the current command or on historical evaluation of host commands. Characteristics of the current command that may be evaluated include logical address, command sector count, alignment with file system cluster (such as DOS cluster), logical relationship to previous command and address relative to file system sectors. The address relative to that of a range being managed by a non-sequential type of update block can also be considered. Characteristics of historical operation can include host command sequences for streams of sequential data, host command structures for complete files, records of frequently updated logical address ranges and final addresses of recently written sequential data. The adaptive metablock manager may establish a dialogue with the host, under an appropriate host interface protocol, to gain access to information, which would allow an appropriate metablock size to be determined.

Where data is relocated, adaptive metablock size may be based on the number of logical groups that contain relocated data. Where control data is stored in adaptive metablocks the adaptive metablock size may be fixed according to the type of data to be stored. Adaptive metablock size may be determined based on balancing increased parallelism obtained with large adaptive metablocks with reduced garbage collection obtained with smaller adaptive metablocks. Once the number of erase blocks required is determined by the adaptive metablock manager, a request for that number of erase blocks is sent to the block allocation manager.

A block allocation manager selects erase blocks from separate planes of the memory array. The planes may be selected based on the number of available erase blocks in the plane. Where adaptive metablocks of various sizes are used, planes may be filled to different levels. Thus, some planes could become full while others still have available erase blocks. Should this happen, a plane of the array would be unavailable and parallelism would be limited accordingly. To prevent or defer this happening, a block allocation manager gives a low priority to planes containing a small number of available erase blocks and a high priority to planes containing a large number of available erase blocks when assigning erase blocks to form an adaptive metablock. Planes that are still busy from a previous operation may be given a low priority also. Planes having data for relocation may be given a high priority where data may be relocated within a plane in a more efficient manner than relocating from one plane to another. The block allocation manager selects available erase blocks from an allocation block list (ABL).

FIG. 18A shows the erased block management hierarchy used with adaptive metablocks. Upon receipt of a request from the adaptive metablock manager to allocate a metablock of a specific size, the block allocation manager selects erase blocks from separate planes and updates relevant control structures to link the blocks into a metablock. Planes from which erased blocks are used are selected by an algorithm according to predetermined criteria. Planes containing fewer erased blocks are given low priority. Planes that are still busy from a previous operation are given a low priority. Planes may be given a high priority where their selection would allow data to be copied within the plane instead of copying from another plane. In some architectures, such in-plane copying may be more efficient.

Erased blocks are managed separately for each plane of the array. When a plane is selected, any erase block from that plane may be chosen to form part of an adaptive metablock. Typically, erase blocks are chosen from the top of a list, while newly available erase blocks are added to the bottom of the list. Erase blocks are managed by a hierarchy of lists as shown in FIG. 18A. An individual erase block may only appear in one list at a time. Bad blocks do not appear in any list and are thus not used for data storage. By moving erased block addresses between lists, write/cycle counts may be distributed throughout the memory array. This provides wear leveling that reduces the risk of failure of individual erase blocks.

The Allocation Block List (ABL) 1810 is a short list of erased block addresses from which erased blocks are selected to form metablocks. Thus, ABL 1810 is at the top of the hierarchy of lists. Within ABL 1810, separate fields are maintained for each plane of the memory array. Typically, ABL 1810 is maintained in a non-volatile memory such as controller RAM. However, a copy is maintained in the non-volatile memory also.

A copy of ABL 1810 is written to a Log 1813 every time an adaptive metablock is formed and the erased blocks used to form it are removed from ABL 1810. Thus, the copy of ABL 1810 in Log 1813 is regularly updated. When an erased block becomes available through an erase operation, it is added to ABL 1810 in the field corresponding to the plane containing the erase block. ABL 1810 may be restored after a loss of power by copying from Log 1813. However, the Log copy may not be up-to-date because of the addition of erased blocks to ABL 1810 since the previous copying to Log 1813. Such erased blocks are easily identified from other data structures. Specifically, Log 1813 contains records of allocated metablocks. Allocated metablocks are metablocks, or adaptive metablocks, in which data are currently being updated by the host. Thus, when power is first applied, the first sector of each erase block of the original metablock may be scanned to determine if the erase blocks of the original metablock have been erased. If an erase block has been erased, its address is added to the ABL. Address data is maintained in Log 1813 as a starting logical group address concatenated with the format shown in FIG. 16 with entries for metablock size, group number and block address. Thus, a complete copy of ABL 1810 may be easily rebuilt after a loss of power. The Log may also contain a list of erase blocks with fully obsolete data that are available for erasure.

ABL 1810 may be initialized by moving a predefined number of block addresses from an Erased Block List (EBL) 1811. Each field of the ABL may be initialized by moving addresses from the corresponding EBL field. For example, ABL fields may be filled to half their capacity. When a block is required for allocation to a metablock, the first block in the relevant ABL field is used and its address is removed from the ABL. When a block is erased during garbage collection, it is added to the end of the relevant ABL field.

ABL 1810 may also be refilled with erased block addresses from EBL 1811. This may be necessary where. ABL 1810 is empty. Erased block addresses may be exchanged between ABL 1810 and EBL 1811 when a field of ABL 1810 is full or empty. Exchange may be done for just one field (or plane of the array) or for all fields. The exchange may include topping up ABL 1810 or may include a full exchange of all the entries in ABL 1810. An exchange may be triggered by a field becoming full or empty or may be triggered by another event or done on a periodic basis.

EBL 1811 is generally maintained in a sector that is held in non-volatile memory. It contains a list of erased blocks with separate fields for each plane of the array. It is in the same format as ABL 1810 and thus, entries may easily be exchanged between EBL 1811 and ABL 1810. Because EBL 1811 is maintained as a single sector in non-volatile memory, it may be rapidly accessed and updated thus facilitating exchange between EBL 1811 and ABL 1810. The exchange of addresses between EBL and ABL may occur when the ABL is full or empty. Alternatively, the exchange may occur more frequently to avoid heavy usage of particular locations in the memory array. The addresses in EBL 1811 may be exchanged with ABL 1810 and also with Plane Block Lists.

An EBL sector may be maintained in an EBL block containing only EBL sectors. FIG. 18B shows EBL block 1801 having multiple EBL sectors. When EBL data is changed, a new EBL sector is written and the old EBL sector becomes obsolete. Thus, obsolete sectors 1803 contain prior copies of the EBL that are no longer valid. Only the last written EBL sector 1802 is valid. An EBL sector may also contain a count of erase blocks listed in each EBL field. These counts are used as one factor in selecting planes when forming adaptive metablocks. A copy of these counts may be maintained in Log 1813 also.

A Plane Block List (PBL) such as PBL 1812 is maintained in non-volatile memory for each plane of the array. PBL 1812 is a list of erase blocks in a particular plane of the memory array. Erase blocks that are listed in either ABL 1810 or EBL 1811. are not listed in PBL 1812. PBL 1812 may occupy one sector, though the sector need not be full. Typically, PBLs are grouped together in a PBL block or PBL blocks. A PBL block is a dedicated block containing only PBL sectors. When information in a PBL sector is changed an updated version is written to the next position in the PBL block. The old sector is marked as obsolete. Only one valid PBL sector exists in a particular PBL block for a particular plane. However, two or more valid PBL sectors may exist for a particular plane if the PBL sectors are in different PBL blocks. A PBL sector has two fields, a set of entries that define the locations of erase blocks and a sector index that lists the positions of all valid PBL sectors within the. PBL block. The entries defining locations of erase blocks are not necessarily in any particular order. The order of entries may be the result of exchange with the corresponding EBL field. Only the index of the last written PBL sector is valid. In a partially written memory, there are a lot of erased blocks and thus a lot of PBL sectors requiring a lot of PBL blocks. However, as the memory is filled, the number of erased blocks diminishes and the number of PBL blocks needed diminishes. In a logically full memory system, there may be no PBL blocks. The exchange of addresses between PBL 1812 and EBL is similar to that between EBL and ABL. The exchange may be unidirectional or bi-directional. Where multiple PBL blocks are used, one PBL block may be the active block used for exchanges. The active PBL block may be periodically changed. A field in EBL 1811 may be updated from a single PBL sector as a background operation.

FIG. 18C shows an address table management hierarchy for address translation information in a memory system using adaptive metablocks. When data sectors are written to the memory array according to a data update algorithm, the Address Table Manager updates relevant control data structures in the address table management hierarchy to create a non-volatile record of logical-to-physical mapping and to allow fast translation of any sector in the memory array. Fast translation may be achieved by allowing the physical location of any sector to be determined by reading a single sector from non-volatile memory. Where the physical location is not yet updated in non-volatile memory, it may be rapidly determined from volatile RAM. Because the size and configuration of adaptive metablocks is variable, it would be hard to recover the locations of such erasable blocks in a metablock if they are not stored in non-volatile memory. Thus, the locations of erase blocks of a metablock are stored in non-volatile memory.

At the top of the hierarchy of FIG. 18C is a Write Sector List (WSL) 1814. WSL 1814 is generally kept in volatile memory such as controller RAM. WSL 1814 identifies sectors associated with a sequential write stream by a host or relocated from another location in non-volatile memory. A separate WSL exists for each host write stream. A WSL is opened when a metablock is allocated for a new write stream from a host. A WSL may have an abbreviated form such as a starting location and the number of sectors written.

Log 1813 is below WSL 1814. Log 1813 stores a cumulative list of adaptive metablocks allocated for storage of sectors listed in WSL 1814. Log 1813 also contains copies of all WSLs at the time it is updated. Log 1813 is updated whenever a metablock is allocated. Log 1813 may be contained in a Log sector within a Log block. When information in Log 1813 is changed, a new Log sector is written in the next available position in the Log block. The previous Log sector becomes obsolete and only the last written Log sector is valid. Below Log 1813 are the Temporary Group Address Table (TGAT) 1815 and Group Address Table (GAT) 1816. GAT 1816 is an address table stored in sectors in non-volatile memory containing a physical address for every logical group arranged sequentially in logical group address order. Thus, the nth entry in GAT relates to the logical group with logical group address n. The address data stored in GAT 1816 is in the format shown in FIG. 16 with entries for metablock size, group number and block address.

GAT sectors may be stored in a dedicated GAT block that has entries for a logically contiguous set of logical groups. A GAT block is divided into two partitions a GAT partition and a TGAT partition. The GAT partition contains an original entry for each logical group in the logical address range of the GAT block. The TGAT partition contains sectors having the same format as GAT sectors. TGAT sectors are used to update address data before updating the GAT. Periodically, the GAT partition in a block is rewritten to incorporate updates recorded in sectors in the TGAT partition. A TGAT sector temporarily replaces a corresponding sector in the GAT to update address information. TGAT sectors contain an index of valid TGAT sectors. This index is only valid in the last written TGAT sector. No such index is needed for GAT. A TGAT sector updates a GAT sector with address information from the Log associated with a WSL. The WSL and Log entries are then deleted.

The physical sector address of a sector of data having a particular logical address may be determined from lists 1814-1816. The WSLs are first read to determine if the sector has been recently written. If so, the physical sector address is found from the metablock address corresponding to the sector's position in the WSL. If the sector is not found in the WSLs, an index in a TGAT sector is read to determine if the sector has a TGAT entry. If so, the physical sector address is determined by reading the appropriate TGAT sector. If the sector is not listed in either WSLs or TGAT then the appropriate GAT sector is read to determine its physical location. Look-ahead caching of Log, TGAT and GAT entries in controller SRAM can be performed to reduce address translation time when data is written or read in sequential address order.

FIG. 18D shows the data structures used to manage erased blocks and address translation. In addition to the lists already described, Block Addresses 1821 and Boot Block 1820 are shown. Block addresses 1821 form a listing of the physical addresses of all erase blocks that store control data structures. A dedicated Block Address (BA) block may be used to store BA sectors that contain block addresses 1821. When the location of a control block is changed, a new BA sector is written. Prior BA sectors are marked as obsolete. Therefore, only the last written BA sector is valid.

Boot block 1820 is a dedicated block containing boot sectors. When information in the boot sector is changed, a new boot sector is written. Only the last written boot sector is valid. Boot block 1820 has a fixed physical location and is identified by scanning during system initialization. Scanning may be necessary because the location of the boot block is fixed within a range rather than at a precise location. This is to allow for the possibility of bad erase blocks. The location of the boot block may be fixed within a narrow range so the scanning may be rapidly completed. The boot sector contains the location of block addresses 1821 and any other system configuration information that may be required. Thus, upon initialization, the data structures in FIG. 18D may be rapidly rebuilt. Boot block 1820 has a fixed location and indicates the location of block addresses 1821, which indicate the locations of the data structures shown.

Certain data structures described above use dedicated blocks such as the EBL block, PBL block and GAT block. Such dedicated blocks may be a single erase block of the memory array or may be an adaptive metablock comprising multiple erase blocks. One advantage of using an adaptive metablock is that the size of the adaptive metablock used may be adjusted to the amount of data to be held. For example, where a memory has a large number of erased blocks, there may be a lot of PBL sectors and so a large PBL block might be suitable. When the memory array fills with data, the number of erased blocks is less, thus the number of PBL sectors is less and a smaller PBL block might be suitable.

Where adaptive metablocks of less than the maximum size are used for control data, the control data may be programmed in parallel with other data. Where data is sent from a host to be programmed to a memory array, such parallel programming may allow control data to be updated simultaneously with the programming of host data. Thus, there is no interruption to the programming of host data while the control data is updated, though there may be a reduction in programming speed because of reduced parallelism available for the host data programming. Thus, the examples of parallel programming shown in FIGS. 15D, 15E and 15F could apply to programming a combination of control data, copied data and host data in parallel. This may avoid latency observed in other memory systems where host data programming is delayed until control data has been programmed.

Although the invention has been described with respect to various exemplary embodiments, it will be understood that the invention is entitled to protection within the full scope of the appended claims.

The invention claimed is:

1. A non-volatile memory system, comprising:
an array of memory cells arranged in separately programmable planes;
a plane having multiple erase blocks, an erase block being the smallest unit of the array that may be individually erased;
the system configured to select a number of planes according to characteristics of data to be stored; and the system configured to program individual erase blocks within each of the selected planes in parallel.

2. The system of claim 1 wherein an individual plane is selected according to the number of available erase blocks remaining in the individual plane.

3. The system of claim 1 further comprising a second array of memory cells; wherein the array of memory cells is in a flash memory and the second array of memory cells is in a non-volatile random access memory.

4. A method of storing data in a nonvolatile memory connected to a host, comprising:
   receiving a first number of logically sequential sectors of data from the host;
   selecting a second number of erase blocks for storage of the first number of sectors, each of the second number of erase blocks located in a different plane, the second number being less than the number of planes in the memory, the second number being the smallest number of erase blocks that can contain the first number of sectors; and
   programming the first number of sectors to the second number of erase blocks in parallel.

5. The method of claim 4 wherein ones of the first number of sectors are stored in an individual one of the second number of erase blocks in a non-sequential order.

6. The method of claim 4 further comprising, in parallel with programming the first number of sectors to the second number of erase blocks, programming additional sectors to additional erase blocks, the additional sectors having a logical address range that is separated from the logical address range of the first number of sectors.

7. The method of claim 6 further comprising subsequently erasing the second number of erase blocks in parallel without erasing the additional erase blocks.

8. The method of claim 7 further comprising subsequently selecting a first at least one of the second number of erase blocks for programming without selecting a second at least one of the second number of erase blocks for programming.

* * * * *

UNITED STATES PATENT AND TRADEMARK OFFICE
CERTIFICATE OF CORRECTION

| | | |
|---|---|---|
| PATENT NO. | : 7,433,993 B2 | Page 1 of 1 |
| APPLICATION NO. | : 10/749189 | |
| DATED | : October 7, 2008 | |
| INVENTOR(S) | : Alan Welsh Sinclair | |

It is certified that error appears in the above-identified patent and that said Letters Patent is hereby corrected as shown below:

ON THE TITLE PAGE

Item (73), change "San Disk" to --SanDisk--.

Signed and Sealed this

Sixteenth Day of December, 2008

JON W. DUDAS
*Director of the United States Patent and Trademark Office*